(12) United States Patent
McLachlan

(10) Patent No.: US 9,305,275 B2
(45) Date of Patent: Apr. 5, 2016

(54) PLATFORM FOR RAPID DEVELOPMENT OF APPLICATIONS

(75) Inventor: Paul Damien McLachlan, Newcastle, WA (US)

(73) Assignee: Apptio, Inc., Bellevue, WA (US)

(*) Notice: Subject to any disclaimer, the term of this patent is extended or adjusted under 35 U.S.C. 154(b) by 949 days.

(21) Appl. No.: 13/415,701

(22) Filed: Mar. 8, 2012

(65) Prior Publication Data

US 2012/0233547 A1   Sep. 13, 2012

Related U.S. Application Data

(60) Provisional application No. 61/450,539, filed on Mar. 8, 2011.

(51) Int. Cl.
*G06F 9/44* (2006.01)
*G06Q 10/06* (2012.01)
*G06F 17/30* (2006.01)

(52) U.S. Cl.
CPC .......... *G06Q 10/06* (2013.01); *G06F 17/30607* (2013.01); *Y10S 707/955* (2013.01)

(58) Field of Classification Search
CPC .................................................... G06Q 10/06
USPC .................................................. 717/100–140
See application file for complete search history.

(56) References Cited

U.S. PATENT DOCUMENTS

| 4,744,026 A | 5/1988 | Vanderbei |
| 5,249,120 A | 9/1993 | Foley |
| 5,721,919 A | 2/1998 | Morel et al. |
| 5,799,286 A | 8/1998 | Morgan et al. |
| 5,802,508 A | 9/1998 | Morgenstern |

(Continued)

FOREIGN PATENT DOCUMENTS

JP   2011134268 A   7/2011

OTHER PUBLICATIONS

Fok, Chien-Liang, Gruia-Catalin Roman, and Chenyang Lu. "Rapid development and flexible deployment of adaptive wireless sensor network applications." Distributed Computing Systems, 2005. ICDCS 2005. Proceedings. 25th IEEE International Conference on. IEEE, 2005, pp. 653-662.*

(Continued)

*Primary Examiner* — Satish Rampuria
(74) *Attorney, Agent, or Firm* — John W. Branch; Lowe Graham Jones PLLC

(57) ABSTRACT

Various embodiments are directed towards a platform for rapid development of applications. A data processing application may be generated by applying templates, work streams, change entries, and user modifications to generate data processing applications. In at least one of the various embodiments, the applications may be generated based project initial instructions and by receiving and processing example data in combination with templates, change entries, and work streams. Further, in at least one of the various embodiments, modifications made to the generated applications may be preserved as change entries associated with a work stream. In at least one of the various embodiments, separate applications may be generated based on the work streams and/or change streams of other applications. In at least one of the various embodiments, if a generated application may be modified a new revision number may be associated with the modified version of the application.

18 Claims, 18 Drawing Sheets

(56) References Cited

U.S. PATENT DOCUMENTS

| | | | |
|---|---|---|---|
| 5,970,476 A | 10/1999 | Fahey | |
| 5,991,741 A | 11/1999 | Speakman et al. | |
| 6,014,640 A | 1/2000 | Bent | |
| 6,032,123 A | 2/2000 | Jameson | |
| 6,047,290 A | 4/2000 | Kennedy et al. | |
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 | 11/2001 | Ye | |
| 6,330,552 B1 | 12/2001 | Farrar et al. | |
| 6,424,969 B1 | 7/2002 | Gruenwald | |
| 6,507,825 B2 | 1/2003 | Suh | |
| 6,578,005 B1 | 6/2003 | Lesaint et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,983,321 B2 | 1/2006 | Trinon et al. | |
| 7,050,997 B1 | 5/2006 | Wood, Jr. | |
| 7,130,822 B1* | 10/2006 | Their | G06Q 30/0202 705/1.1 |
| 7,149,700 B1 | 12/2006 | Munoz et al. | |
| 7,177,850 B2 | 2/2007 | Argenton et al. | |
| 7,263,527 B1 | 8/2007 | Malcolm | |
| 7,308,427 B1 | 12/2007 | Hood | |
| 7,321,869 B1 | 1/2008 | Phibbs, Jr. | |
| 7,590,937 B2 | 9/2009 | Jacobus et al. | |
| 7,634,431 B2 | 12/2009 | Stratton | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,774,458 B2 | 8/2010 | Trinon et al. | |
| 7,783,759 B2 | 8/2010 | Eilam et al. | |
| 7,813,948 B2 | 10/2010 | Ratzloff | |
| 7,877,742 B2 | 1/2011 | Duale et al. | |
| 7,899,235 B1 | 3/2011 | Williams et al. | |
| 7,930,396 B2 | 4/2011 | Trinon et al. | |
| 7,933,861 B2 | 4/2011 | Zadorozhny | |
| 7,945,489 B2 | 5/2011 | Weiss et al. | |
| 7,966,235 B1* | 6/2011 | Capelli | G06Q 10/10 705/35 |
| 8,010,584 B1 | 8/2011 | Craver et al. | |
| 8,024,241 B2 | 9/2011 | Bailey et al. | |
| 8,175,863 B1 | 5/2012 | Ostermeyer et al. | |
| 8,200,518 B2 | 6/2012 | Bailey et al. | |
| 8,209,218 B1 | 6/2012 | Basu et al. | |
| 8,260,959 B2 | 9/2012 | Rudkin et al. | |
| 8,370,243 B1 | 2/2013 | Cernyar | |
| 8,423,428 B2 | 4/2013 | Grendel et al. | |
| 8,484,355 B1 | 7/2013 | Lochhead et al. | |
| 8,601,263 B1 | 12/2013 | Shankar et al. | |
| 8,768,976 B2 | 7/2014 | McLachlan et al. | |
| 2002/0002557 A1 | 1/2002 | Straube et al. | |
| 2002/0016752 A1 | 2/2002 | Suh | |
| 2002/0069102 A1 | 6/2002 | Vellante et al. | |
| 2002/0123945 A1 | 9/2002 | Booth et al. | |
| 2002/0145040 A1 | 10/2002 | Grabski, III | |
| 2002/0156710 A1 | 10/2002 | Ryder | |
| 2002/0178198 A1 | 11/2002 | Steele | |
| 2003/0083888 A1 | 5/2003 | Argenton et al. | |
| 2003/0139960 A1 | 7/2003 | Nishikawa et al. | |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172368 A1 | 9/2003 | Alumbaugh et al. | |
| 2003/0195780 A1 | 10/2003 | Arora et al. | |
| 2003/0236721 A1* | 12/2003 | Plumer | G06Q 40/12 705/30 |
| 2004/0059611 A1 | 3/2004 | Kananghinis et al. | |
| 2004/0093344 A1 | 5/2004 | Berger et al. | |
| 2004/0111509 A1 | 6/2004 | Eilam et al. | |
| 2004/0186762 A1 | 9/2004 | Beaven et al. | |
| 2004/0243438 A1 | 12/2004 | Mintz | |
| 2005/0004856 A1 | 1/2005 | Brose et al. | |
| 2005/0060298 A1 | 3/2005 | Agapi et al. | |
| 2005/0060317 A1 | 3/2005 | Lott et al. | |
| 2005/0120032 A1 | 6/2005 | Liebich et al. | |
| 2005/0171918 A1 | 8/2005 | Eden et al. | |
| 2006/0041458 A1 | 2/2006 | Ringrose et al. | |
| 2006/0080264 A1 | 4/2006 | Zhang et al. | |
| 2006/0085302 A1 | 4/2006 | Weiss et al. | |
| 2006/0085465 A1* | 4/2006 | Nori | G06F 17/30297 |
| 2006/0106658 A1 | 5/2006 | Johanson et al. | |
| 2006/0161879 A1 | 7/2006 | Lubrecht et al. | |
| 2006/0167703 A1 | 7/2006 | Yakov | |
| 2006/0178960 A1 | 8/2006 | Lepman | |
| 2006/0179012 A1 | 8/2006 | Jacobs | |
| 2006/0190497 A1 | 8/2006 | Inturi et al. | |
| 2006/0200477 A1 | 9/2006 | Barrenechea | |
| 2006/0212334 A1 | 9/2006 | Jackson | |
| 2006/0224946 A1 | 10/2006 | Barrett et al. | |
| 2006/0228654 A1 | 10/2006 | Sanjar et al. | |
| 2006/0282429 A1 | 12/2006 | Hernandez-Sherrington et al. | |
| 2007/0113289 A1 | 5/2007 | Blumenau | |
| 2007/0124162 A1 | 5/2007 | Mekyska | |
| 2007/0198982 A1 | 8/2007 | Bolan et al. | |
| 2007/0214413 A1 | 9/2007 | Boeckenhauer | |
| 2007/0226090 A1 | 9/2007 | Stratton | |
| 2007/0260532 A1 | 11/2007 | Blake, III | |
| 2007/0271203 A1 | 11/2007 | Delvat | |
| 2007/0276755 A1 | 11/2007 | Rapp | |
| 2007/0282626 A1 | 12/2007 | Zhang et al. | |
| 2008/0033774 A1 | 2/2008 | Kimbrel et al. | |
| 2008/0065435 A1 | 3/2008 | Ratzloff | |
| 2008/0071844 A1 | 3/2008 | Gopal et al. | |
| 2008/0201269 A1 | 8/2008 | Hollins et al. | |
| 2008/0295096 A1 | 11/2008 | Beaty et al. | |
| 2008/0312979 A1 | 12/2008 | Lee et al. | |
| 2009/0012986 A1 | 1/2009 | Arazi et al. | |
| 2009/0018880 A1 | 1/2009 | Bailey et al. | |
| 2009/0100017 A1 | 4/2009 | Graves et al. | |
| 2009/0100406 A1* | 4/2009 | Greenfield | G06F 8/20 717/104 |
| 2009/0144120 A1 | 6/2009 | Ramachandran | |
| 2009/0150396 A1 | 6/2009 | Elisha et al. | |
| 2009/0198535 A1 | 8/2009 | Brown et al. | |
| 2009/0216580 A1 | 8/2009 | Bailey et al. | |
| 2009/0234892 A1 | 9/2009 | Anglin et al. | |
| 2009/0300173 A1 | 12/2009 | Bakman et al. | |
| 2009/0319316 A1 | 12/2009 | Westerfeld et al. | |
| 2010/0005014 A1 | 1/2010 | Castle et al. | |
| 2010/0005173 A1 | 1/2010 | Baskaran et al. | |
| 2010/0042455 A1 | 2/2010 | Liu et al. | |
| 2010/0082380 A1 | 4/2010 | Merrifield, Jr. et al. | |
| 2010/0094740 A1 | 4/2010 | Richter | |
| 2010/0125473 A1 | 5/2010 | Tung et al. | |
| 2010/0169477 A1 | 7/2010 | Stienhans et al. | |
| 2010/0211667 A1 | 8/2010 | O'Connell, Jr. | |
| 2010/0250419 A1 | 9/2010 | Ariff et al. | |
| 2010/0250421 A1 | 9/2010 | Ariff et al. | |
| 2010/0250642 A1 | 9/2010 | Yellin et al. | |
| 2010/0293163 A1 | 11/2010 | McLachlan | |
| 2010/0299233 A1 | 11/2010 | Licardi et al. | |
| 2010/0306382 A1 | 12/2010 | Cardosa et al. | |
| 2010/0325606 A1* | 12/2010 | Sundararajan | G06F 8/10 717/105 |
| 2010/0332262 A1 | 12/2010 | Horvitz et al. | |
| 2010/0333109 A1 | 12/2010 | Milnor | |
| 2011/0016214 A1 | 1/2011 | Jackson | |
| 2011/0016448 A1* | 1/2011 | Bauder | G06F 8/34 717/104 |
| 2011/0022861 A1 | 1/2011 | Agneeswaran et al. | |
| 2011/0066628 A1 | 3/2011 | Jayaraman | |
| 2011/0106691 A1 | 5/2011 | Clark et al. | |
| 2011/0167034 A1 | 7/2011 | Knight et al. | |
| 2011/0225277 A1 | 9/2011 | Freimuth et al. | |
| 2012/0023170 A1 | 1/2012 | Matignon et al. | |
| 2012/0066020 A1 | 3/2012 | Moon et al. | |
| 2012/0131591 A1 | 5/2012 | Moorthi et al. | |
| 2012/0150736 A1 | 6/2012 | Dickerson et al. | |
| 2012/0232947 A1 | 9/2012 | McLachlan et al. | |
| 2012/0233217 A1 | 9/2012 | Purpus et al. | |
| 2012/0233547 A1 | 9/2012 | McLachlan | |
| 2013/0041819 A1 | 2/2013 | Khasho | |

(56) References Cited

U.S. PATENT DOCUMENTS

| | | |
|---|---|---|
| 2013/0060595 A1 | 3/2013 | Bailey |
| 2013/0103654 A1 | 4/2013 | McLachlan et al. |
| 2013/0138470 A1 | 5/2013 | Goyal et al. |
| 2013/0179371 A1 | 7/2013 | Jain et al. |
| 2013/0201193 A1 | 8/2013 | McLachlan et al. |
| 2013/0282537 A1 | 10/2013 | Snider |
| 2013/0346390 A1 | 12/2013 | Jerzak et al. |
| 2014/0067632 A1 | 3/2014 | Curtis |

OTHER PUBLICATIONS

Flippo, Frans, Allen Krebs, and Ivan Marsic. "A framework for rapid development of multimodal interfaces." Proceedings of the 5th international conference on Multimodal interfaces. ACM, 2003, pp. 109-116.*

Stewart, David B., and Pradeep K. Khosla. "Rapid development of robotic applications using component-based real-time software." Intelligent Robots and Systems 95.'Human Robot Interaction and Cooperative Robots', Proceedings. 1995 IEEE/RSJ International Conference on. vol. 1. IEEE, 1995, pp. 465-470.*

"Notice from the European Patent Office dated Oct. 1, 2007 concerning business methods," Official Journal EPO, Nov. 2007, pp. 592-593.

"Activity Based Costing is the best allocation methodology," Apptio, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#. Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#. Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

SAS Activity-Based Management, 2010, Fact Sheet, 4 pages.

Henriet et al. "Traffic-Based Cost Allocation in a Network." The Rand Journal of Economics, 1996, pp. 332-345.

Rudnick et al., "Marginal Pricing and Supplement Cost Allocation in Transmission Open Access." Power Systems, IEEE Transactions on 10.2, 1995, pp. 1125-1132.

Office Communication for U.S. Appl. No. 13/452,628 mailed Jun. 23, 2015, pp. 3.

International Search Report and Written Opinion for PCT/US2015/015486 mailed Jun. 29, 2015, pp. 13.

Office Communication for U.S. Appl. No. 13/935,147 mailed Jul. 9, 2015, pp. 6.

Office Communication for U.S. Appl. No. 13/415,797 mailed Jul. 23, 2015, pp. 22.

Office Communication for U.S. Appl. No. 13/649,019 mailed Sep. 23, 2015, pp. 15.

Office Communication for U.S. Appl. No. 13/365,150 mailed Sep. 24, 2015, pp. 15.

Office Communication for U.S. Appl. No. 14/033.130 mailed Sep. 15, 2015, pp. 22.

Office Communication for U.S. Appl. No. 13/415,797 mailed Oct. 19, 2015, pp. 3.

Office Communication for U.S. Appl. No. 13/837,815 mailed Sep. 28, 2015, pp. 20.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project management," Wikipedia, the free encyclopedia, accessed Mar. 13, 2012, 14 pages http://en.wikipedia.org/wiki/Project_management—last modified Mar. 7, 2012.

Official Communication for U.S. Appl. No. 13/324,253 mailed Sep. 6, 2013, 21 pages.

Official Communication for U.S. Appl. No. 12/467,120 mailed Oct. 23, 2013, 21 pages.

International Preliminary Report on Patentability for International Patent Application No. PCT/US2012/028378 mailed Sep. 19, 2013, 7 pages.

International Preliminary Report on Patentability for International Patent Application No. PCT/US2012/028353 mailed Sep. 19, 2013, 6 pages.

Official Communication for U.S. Appl. No. 13/452,628 mailed Apr. 22, 2013, 11 pages.

Official Communication for U.S. Appl. No. 13/324,253 mailed Mar. 19, 2013, 3 pages.

Official Communication for U.S. Appl. No. 13/324,253 mailed Jan. 10, 2013, 20 pages.

Official Communication for U.S. Appl. No. 12/467,120 mailed Mar. 26, 2013, 18 pages.

Extended European Search Report in EP Application No. 13151967.0-1955, mailed Apr. 19, 2013, 8 pages.

Official Communication for U.S. Appl. No. 13/324,253 mailed Sep. 25, 2012, 17 pages.

Official Communication for U.S. Appl. No. 12/467,120 mailed Aug. 29, 2012, 3 pages.

Official Communication for U.S. Appl. No. 12/467,120 mailed Jun. 20, 2012, 17 pages.

International Search Report and Written Opinion for International Patent Application No. PCT/US2012/028353 mailed Oct. 31, 2012.

Official Communication for U.S. Appl. No. 12/467,120 mailed Oct. 4, 2011, 12 pages.

International Search Report and Written Opinion for International Patent Application No. PCT/US2010/035021 mailed Jul. 14, 2010, 12 pages.

International Preliminary Report on Patentability for International Patent Application No. PCT/US2010/035021 mailed Nov. 24, 2011, 10 pages.

International Search Report and Written Opinion for International Patent Application No. PCT/US2012/028378 mailed Sep. 12, 2012, 11 pages.

(56) References Cited

OTHER PUBLICATIONS

Office Communication for U.S. Appl. No. 13/837,815 mailed on Apr. 27, 2015, 18 pages.
Office Communication for U.S. Appl. No. 13/675,837 mailed on Apr. 16, 2015, 19 pages.
Office Communication for U.S. Appl. No. 13/917,503 mailed on Apr. 16, 2015, 19 pages.
Office Communication for U.S. Appl. No. 14/180,308 mailed on Apr. 17, 2015, 7 pages.
Office Communication for U.S. Appl. No. 13/452,628 mailed on Mar. 30, 2015, 18 pages.
European Search Report for Application No. 12755613.2 mailed on Jan. 26, 2015, 6 pages.
Office Communication for U.S. Appl. No. 13/324,253 mailed on Feb. 19, 2015, 22 pages.
Office Communication for U.S. Appl. No. 13/949,019 mailed on Feb. 10, 2015, 14 pages.
Office Communication for U.S. Appl. No. 13/324,253 mailed on Oct. 24, 2014, 29 pages.
Office Communication for U.S. Application No. 13/324,253 mailed on Apr. 9, 2014, 3 pages.
Office Communication for U.S. Appl. No. 13/837,815 mailed Sep. 25, 2014, 16 pages.
Office Communication for U.S. Appl. No. 13/675,837 mailed on Apr. 2, 2014, 3 pages.
Office Communication for U.S. Appl. No. 13/837,815 mailed on Apr. 7, 2014, 14 pages.
Office Communication for U.S. Appl. No. 13/415,797 mailed on Jan. 12, 2015, 20 pages.
Office Communication for U.S. Appl. No. 13/452,628 mailed on Oct. 1, 2014, 14 pages.
Office Communication for U.S. Appl. No. 13/365,150 mailed on Dec. 3, 2014, 16 pages.
Office Communication for U.S. Appl. No. 14/180,308 mailed Jan. 30, 2015, 21 pages.
Office Communication for U.S. Appl. No. 13/917,503 mailed Apr. 3, 2014, 47 pages.
Office Communication for U.S. Appl. No. 13/415,797 mailed on Apr. 9, 2014, 18 pages.
Office Communication for U.S. Appl. No. 13/675,837 mailed on Jan. 31, 2014, 37 pages.
Office Communication for U.S. Appl. No. 13/935,147 mailed on Apr. 11, 2014, 22 pages.
Office Communication for U.S. Appl. No. 13/935,147 mailed on Jun. 16, 2014, 25 pages.
Office Communication for U.S. Appl. No. 14/033,130 mailed on May 27, 2014, 22 pages.
Office Communication for U.S. Appl. No. 14/033,130 mailed on Aug. 5, 2014, 25 pages.
Office Communication for U.S. Appl. No. 14/180,308 mailed Sep. 2, 2014, 35 pages.
Office Communication for U.S. Appl. No. 14/180,308 mailed Apr. 8, 2014, 16 pages.
Office Communication for U.S. Appl. No. 13/452,628 mailed Mar. 13, 2014, 15 pages.
Extended European Search Report in EP Application No. 14159413.5 mailed Jul. 4, 2014, 11 pages.
Official Communication for U.S. Appl. No. 13/324,253 mailed Jan. 23, 2014, 25 pages.
Official Communication for U.S. Appl. No. 13/675,837 mailed Jan. 31, 2014, 37 pages.
Official Communication for U.S. Appl. No. 13/917,503 mailed Jan. 31, 2014, 36 pages.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london, 30 pages.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf, 30 pages.
Ward Miles, Optimizing for Cost in the Cloud (selection), AWS Summit, Slideshare Apr. 2012 http://www.slideshare.net/AmazonWebServices/optimizing-your-infrastructure-costs-on-aws, 12 pages.
Amazon Reserved Instances, Amazon Web Services, archives org, Jan. 14, 2013 http://web.archive.org/web/2012011453849/http://aws.amazon.com/rds/reserved-instances/?, 4 pages.
Cost Optimisation with Amazon Web Services, extracted slides, Slideshare Jan. 30, 2012 http://www.slideshare.net/AmazonWebServices/cost-optimisation-with-amazon-web-services?from_search=1, 27 pages.
Deciding an Approach to the cloud AWS Reserved Instances, Cloudyn webpages, Feb. 28, 2012 https://www.cloudyn.com/blog/deciding-an-approach-to-the-cloud-aws-reserved-aws, 2 pages.
Ganesan Harish, Auto Scaling using AWS, Amazon Web Services AWS (selected slides), Apr. 20 2011 http://www.slideshare.net/harishganesan/auto-scaling-using-amazon-web-services-aws, 30 pages.
Official Communication for U.S. Appl. No. 13/452,628 mailed Nov. 18, 2013, 15 pages.
Official Communication for U.S. Appl. No. 14/033,130 mailed Dec. 16, 2013, 15 pages.
Official Communication for U.S. Appl. No. 13/935,147 mailed Oct. 22, 2013, 16 pages.
Official Communication for U.S. Appl. No. 13/917,503 mailed Oct. 10, 2013, 41 pages.
Official Communication for U.S. Appl. No. 13/917,478 mailed Nov. 7, 2013, 15 pages.
Official Communication for U.S. Appl. No. 13/837,815 mailed Oct. 23, 2013, 9 pages.
Official Communication for U.S. Appl. No. 13/675,837 mailed Oct. 10, 2013, 41 pages.
Official Communication for U.S. Appl. No. 13/415,797 mailed Oct. 3, 2013, 17 pages.

* cited by examiner

| ID | Timestamp | User | Status | Description |
|---|---|---|---|---|
| 10001 | 10/12/2011 14:12:00 | admin@apptio.com | Success | Edit driver Desktops/Bad Value in Cost: DriverCTO (name='Bogus Cost' notes='as per DS'.) |
| 10002 | 10/12/2011 14:12:45 | admin@apptio.com | Success | SaveCostObjectUnits: ObjectInfo/Desktops/January/2011 |
| 10003 | 10/12/2011 14:12:55 | admin@apptio.com | Undone | SaveCostObjectUnits: ObjectInfo/Laptops/January/2011 |
| 10004 | 10/12/2011 14:13:00 | admin@apptio.com | Undone | SaveCostObjectUnits: ObjectInfo/PDA/January/2011 |
| 10005 | 10/12/2011 14:13:10 | admin@apptio.com | Success | SaveCostObjectUnits: ObjectInfo/Desktops/January/2011 |
| 10006 | 10/12/2011 14:13:48 | admin@apptio.com | Success | SaveCostObjectUnits: ObjectInfo/Desktops/January/2011 |
| 10007 | 10/12/2011 14:14:04 | admin@apptio.com | Success | SaveTableByKey: Data/January/2011/Desktops/rawTable |
| 10008 | 10/12/2011 14:14:35 | admin@apptio.com | Success | SaveCostObjectUnits: ObjectInfo/Servers/January/2011 |

*FIG. 14*

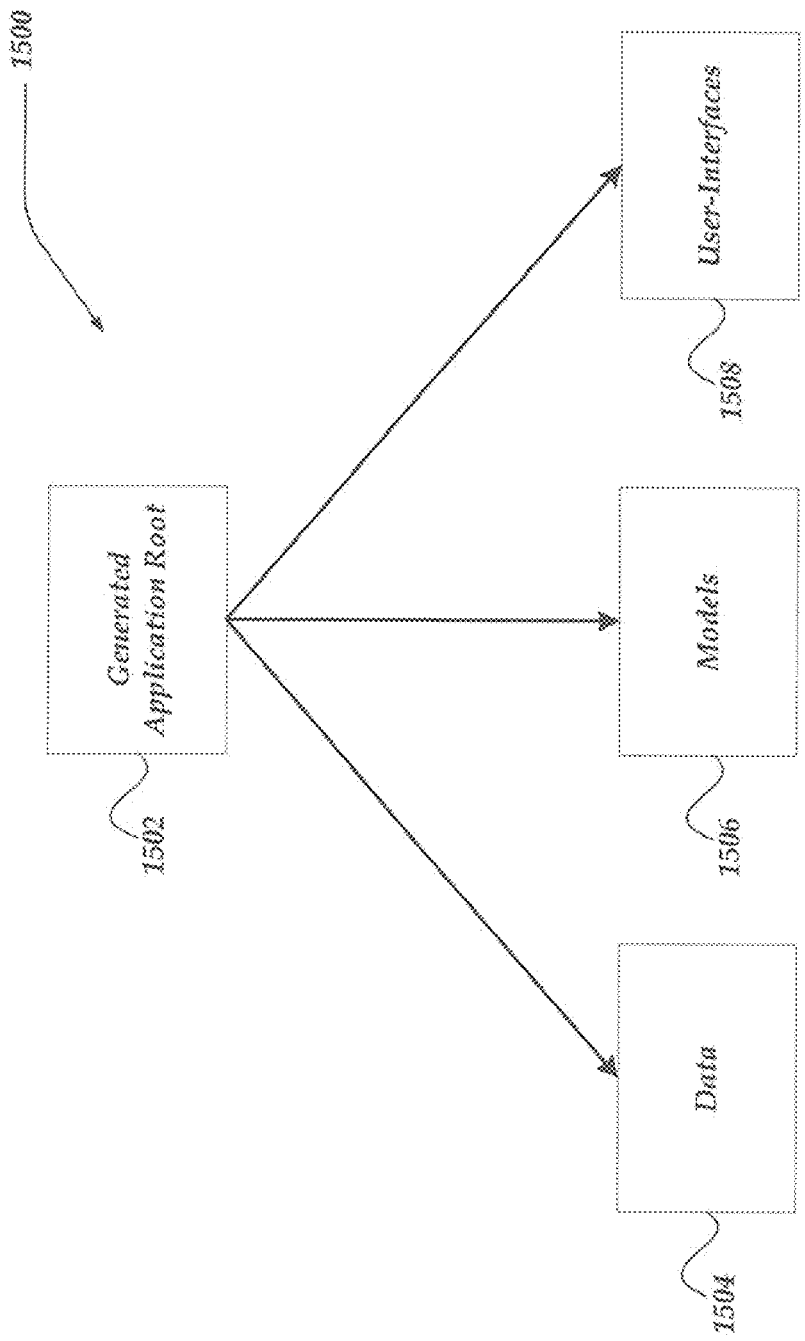

PLATFORM FOR RAPID DEVELOPMENT OF APPLICATIONS

CROSS-REFERENCE TO RELATED APPLICATION(S)

This application is a utility patent application based on previously filed U.S. Provisional Patent Application Ser. No. 61/450,539 filed on Mar. 8, 2011, the benefit of which is hereby claimed under 35 U.S.C. §119(e) and incorporated herein by reference.

TECHNICAL FIELD

The present invention relates generally to computer automated application generation for budgeting, forecasting, and cost accounting, and more particularly, but not exclusively to automating the business management processes associated with budgeting and financial modeling.

BACKGROUND

Businesses that strive to remain viable and successful in today's competitive commercial environment are required to adopt accurate and responsive budgeting practices. To improve efficiency, businesses use financial allocation models that apply modern budgeting, forecasting and cost accounting techniques. For some accounting techniques, the complexity of the financial allocation model increases as the number of tracked activities and elements increases. Therefore, for larger enterprises, sophisticated computer programs and computing devices are often required to assist in generating useful and relevant budgets based on financial allocation models.

In some cases, the large number of items and entities required for financial modeling can make development of modeling applications difficult. Further, the size and complexity of a financial allocation models can make it difficult to design allocation rules for the cost allocations between groups and/or items within the model. Thus, it is with respect to these considerations and others that the invention has been made.

BRIEF DESCRIPTION OF THE DRAWINGS

Non limiting and non exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIG. 14 illustrates a partial view a work stream that may include change entries in accordance with at least one of the various embodiments; and FIGS. 15-18 illustrate a logical representation of a generated data processing application in accordance with the various embodiments.

DESCRIPTION OF THE VARIOUS EMBODIMENTS

Figure 1:
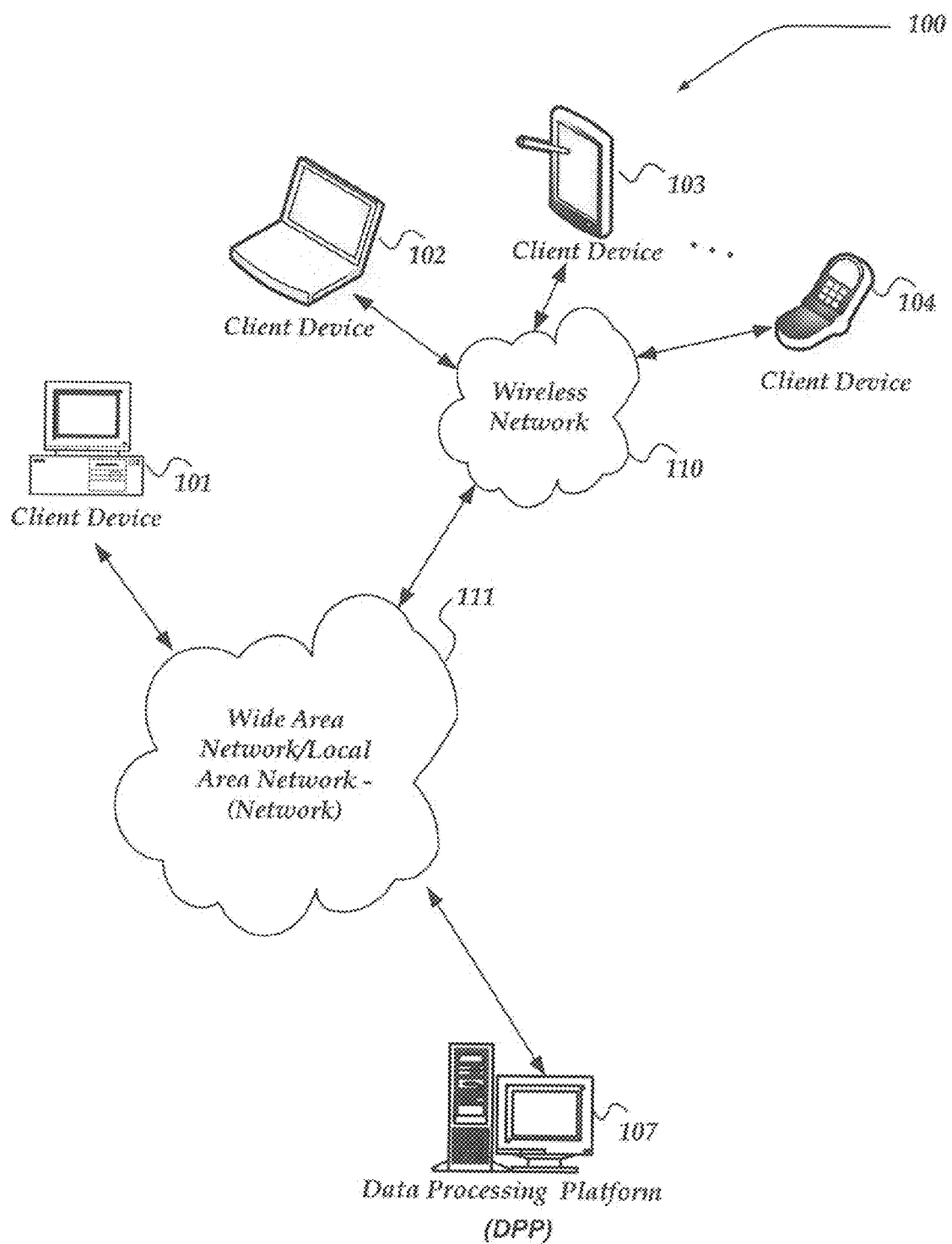
FIG. 1 illustrates a system diagram showing components of an environment in which at least one of the various embodiments may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "Financial allocation model," refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "Cost line item," refers to a single line item in a budget (or finance allocation model) and its associated cost/expense. For example, the costs associated with a particular computer that is an email server may be a single item having a particular cost (e.g., the email server may correspond to a cost line item).

As used herein, the term "Cost object," refers to a set and/or class of cost line items that may be grouped together. For example, a collection of computers performing services such as email, web serving, enterprise resource planning, may represent separate cost line items and they may be grouped into the cost object Servers.

As used herein, the terms "Propagation rules," or "Allocation rules," refer to rules in the financial allocation model that may determine how the costs/expenses from a cost object are allocated between/among other cost objects. Also, allocation rules may be assigned to individual cost line items. For example, if an email server cost line item has a value of $1000 an allocation rule may be defined such that 50% of the expense may be allocated to the Marketing department and 50% may be allocated to the Engineering department. Also, allocation rules may be applied at the cost object as well as the cost line item level.

As used herein, the term "Assignment ratios," refers to an allocation rule, or the results of applying one or more rules, of the distribution ratio of costs to cost line items or cost objects. For example, if $1000 may be allocated to cost object Servers, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the cost object.

As used herein, the terms "generated application," and/or "generated data processing application," refers to an application that has been generated using the platform for rapid application development. Various embodiments disclosed herein may be related to financial applications. But, one of ordinary skill the art will appreciate that generated data processing applications are not limited to financial applications.

As used herein, the term "Work Stream," refers to preserved records of the actions and events that may have been taken to generate a data processing application in accordance with at least one of the various embodiments. In general, a generated application may be a combination of an associated work stream and associated data. In at least one of the various embodiments, a operative data processing application may be generated from a work stream and appropriate source data. In at least one of the various embodiments, a work stream may be implemented as an audit log.

As used herein, the term "change entry," refers to individual elements that may be combined and/or collected into a work stream. Each change entry may be a record of one or more actions and/or state changes made to a generated data processing application as part of the application generation process.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards a platform or system for rapid development of applications. In at least one of the various embodiments, a data processing application may be generated by uploading example data, applying templates, application architectures, object models, work streams, change entries, and user modifications to generate data processing applications. In at least one of the various embodiments, the applications may be generated based on project initial instructions and by receiving and processing example data in combination with templates, object models, application architectures, change entries, and work streams. Further, in at least one of the various embodiments, modifications made to the generated applications may be preserved as change entries associated with a work stream.

In at least one of the various embodiments, separate applications may be generated based on the work streams and/or change streams of other applications. In at least one of the various embodiments, if a generated application may be modified a new revision number may be associated with the modified version of the application. In at least one of the various, embodiments, if a user begins interacting with an out of date application, this application may be re-generated based on newer versions of the relevant work streams. In at least one of the various embodiments, if the application becomes out of date (due to a user making a change, uploading new data, another precedent application being modified, etc), a user may continue using the out-of-date application until the updated application has been generated and completed initialization.

Illustrative Operating Environment

FIG. 1 shows components of one embodiment of an environment in which at least one of the various embodiments may be practiced. Not all the of components may be required to practice various embodiments, and variations in the arrangement and type of the components may be made. As shown, system 100 of FIG. 1 includes local area networks ("LANs")/wide area networks ("WANs")-(network) 111, wireless network 110, client devices 101-104, and Data Processing Platform (DPP) 107.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client devices 102-104 may operate over wired and/or wireless network. Today, many of these devices include a capability to access and/or otherwise communicate over a network such as network 111 and/or wireless network 110. Moreover, client devices 102-104 may access various computing applications, including a browser, or other web-based application.

In at least one of the various embodiments, one or more of client devices 101-104 may be configured to operate within a business or other entity to perform a variety of services for the business or other entity. For example, client devices 101-104 may be configured to operate as a web server, an accounting server, a production server, an email server, video game server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client device may employ the browser application to perform various actions over a network.

Client devices 101-104 also may include at least one other client application that is configured to receive and/or send data, including budgeting and forecasting information, between another computing device. Client applications may include a capability to provide requests and/or receive data relating to the rapid development of applications including budget projects information. The client application may initiate and/or receive data representing change entries, templates, work streams, cost allocations between or among cost objects that may be part of the financial allocation model, or the like. In at least one of the various embodiments, client applications may receive and/or generate data related to budgeting and financial models and may generate tables and relationships between and among the data based on operations that may be performed by a table processor. In at least one of the various embodiments, client devices 101-104 may view and/or modify generated data processing applications.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client devices 102-104 and another computing device, network, or the like.

Network 111 is configured to couple network devices with other computing devices, including, DPP 107, client device (s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
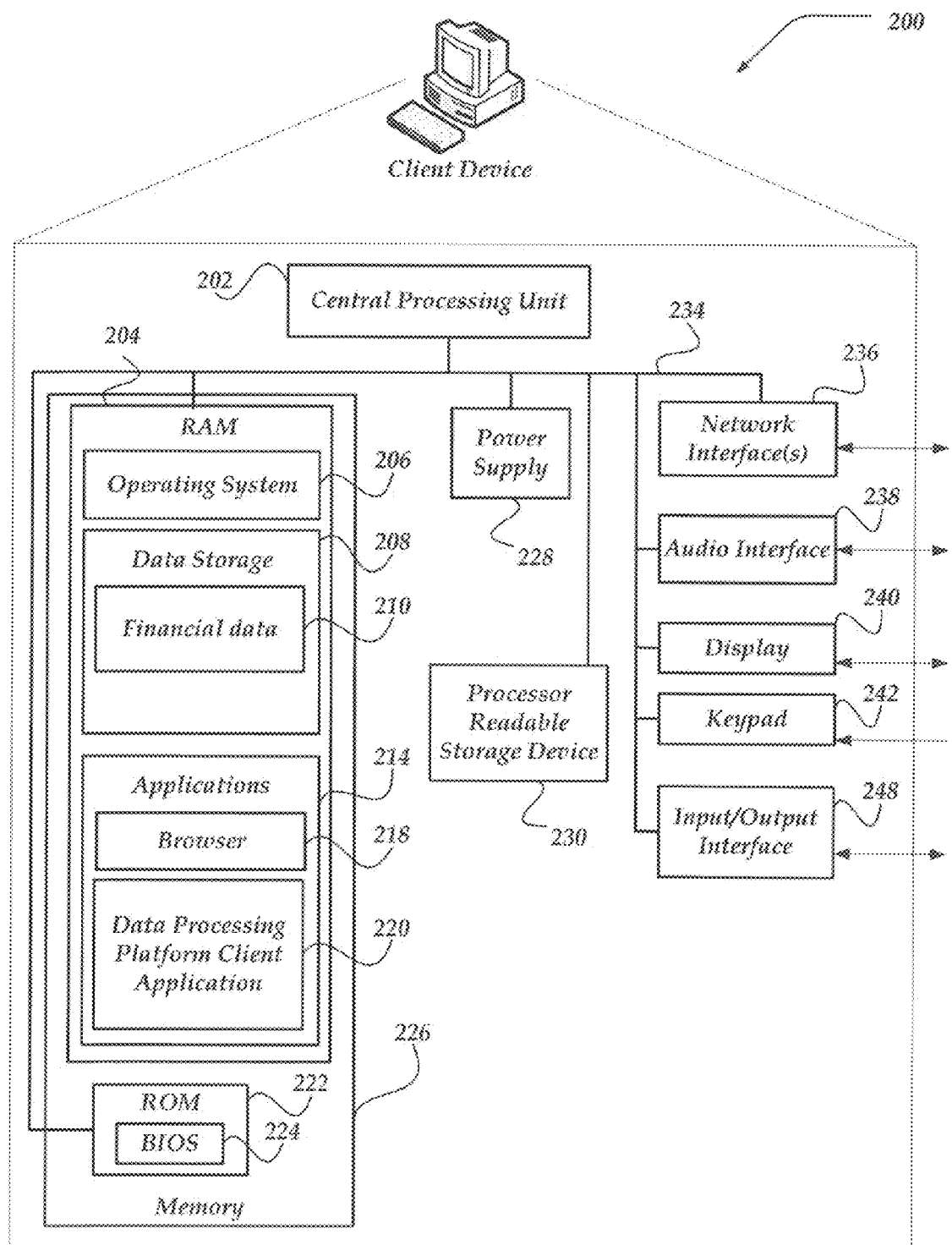
FIG. 2 shows one embodiment of a client device that may be included in a system in accordance with the embodiments.

DPP 107 may include virtually any network device usable to perform rapid development and/or generation of data processing applications, such as network device 200 of FIG. 2. In at least one of the various embodiments, DPP 107 employs various techniques to create, define, generate, and/or automated data processing applications such as budgeting and financial management applications. DPP 107 may include modules for generating data processing applications that may apply models that may include entity propagation rules and/or allocation rules among cost objects. Furthermore, DPP 107 may include and/or generate data processing applications for visualizing the generated entity propagation rules, cost objects, budgets, financial models, or the like.

Devices that may operate as DPP 107 include various network devices, including, but not limited to personal computers, desktop computers, multiprocessor systems, microprocessor-based or programmable consumer electronics, network PCs, server devices, tablet computers, network appliances, or the like. It should be noted that while DPP 107 is illustrated as a single network device, the invention is not so limited. Thus, in another embodiment, DPP 107 may represent a plurality of network devices. For example, In at least one of the various embodiments, DPP 107 may be distributed over a plurality of network devices and/or implemented using cloud architecture.

Moreover, DPP 107 is not limited to a particular configuration. Rather, DPP 107 may operate using a master/slave approach over a plurality of network devices, within a cluster, a peer-to-peer architecture, and/or any of a variety of other architectures. Thus, DPP 107 is not to be construed as being limited to a single environment, and other configurations, and architectures are also envisaged. DPP 107 may employ processes such as described below in conjunction with FIGS. 4-18 to perform at least some of its actions.

Illustrative Client Device

FIG. 2 shows one embodiment of client device 200 that may be included in a system implementing at least one of the various embodiments. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), LTE, HSDPA, user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 may be arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), organic LED, electronic ink, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on a variety of events, including being sent as part of a header during a communication, sent upon request, or the like. At least a portion of the information may also be stored on a disk drive or other computer-readable storage device (not shown) within client device 200. Further, as illustrated, data storage 208 may also store object relationship data 210. In some embodiments, financial data 210 may include a database, text, spreadsheet, folder, file, or the like, that may be configured to maintain and store various budget data, propagation rules, audit logs, change entries, work streams, application templates, device data, or the like. Such financial data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with financial applications that may be generated in part by DPP 107.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Prototol ("VOIP") applications, contact managers, task managers, transcoders, database programs, word processing programs, security applications, spreadsheet programs, games, search programs, and so forth. Applications 214 may include, for example, browser 218 and application development client application 220.

Browser 218 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as DPP 107 of FIG. 1. In one embodiment, browser 218 may enable a user to view and/or manipulate generated data processing applications, budget projects, including creating budgets, modifying financial allocation models, or the like.

In at least one of the various embodiments, a user may employ client device 200 to create and manage data processing applications including budgeting and finance application, and to access information stored or otherwise managed through DPP 107. In at least one of the various embodiments, a user may enter various types of data related to generating data processing applications, including for generated budgeting and finance applications that may be accessible through DPP 107, where the data may be heavily interrelated as might arise within business systems, spreadsheet type data, or the like. Also, in at least one of the various embodiments, the user may be enabled to perform a variety of actions on the data, including, queries, comparisons, summations, analysis, or the like. Additionally, in at least one of the various embodiments, a user may employ client 200 to automate one or more processes that may be used for generating data processing application and/or financial modeling applications. In at least one of the various embodiments, data processing platform client application 220 may be arranged to enable a user to rapidly generate data processing applications for creating and/or managing entity propagation rules, framework models, and financial allocation models. In at least one of the various embodiments, application 220 may be arranged to generate and render visualizations of entity propagations (e.g., allocation rules) among cost objects in a financial allocation model.

In any event, data processing platform client application 220 may employ processes similar to those described below and illustrated in FIGS. 4-18 to perform at least some of its actions.

Illustrative Network Device

Figure 3:
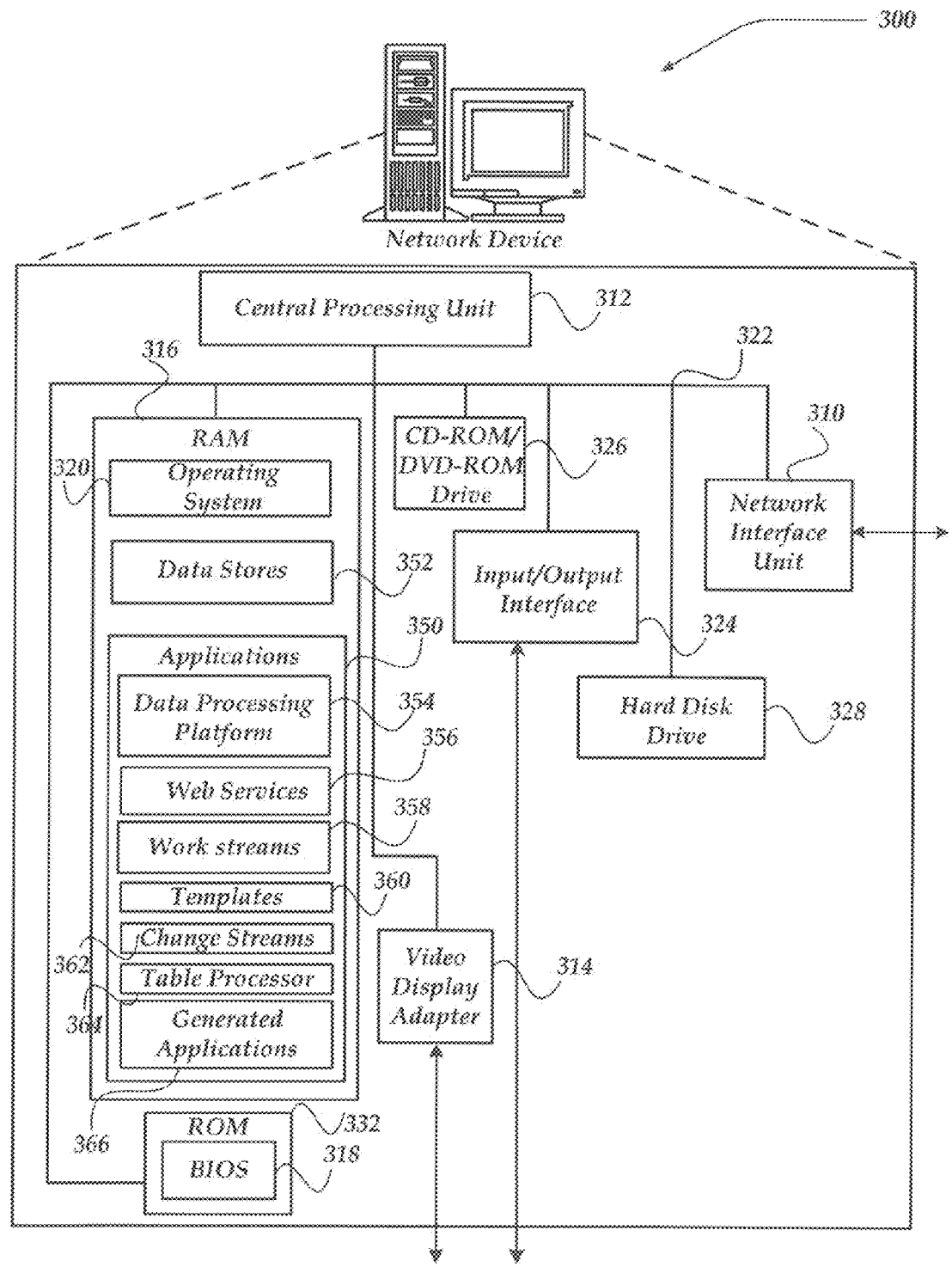
FIG. 3 shows one embodiment of a network device that may be included in a system implementing at least one of the various embodiments.

FIG. 3 shows one embodiment of network device 300 that may be included in a system implementing at least one of the various embodiments. Network device 300 may include many more or less components than those shown. The components shown, however, are sufficient to disclose an illustrative embodiment for practicing the invention. Network device 300 may represent, for example, DPP 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computing device.

As shown, data stores 352 may include a database, text, spreadsheet, folder, file, or the like, that may be configured to maintain and store various financial allocation models, budget data, framework models, entity propagation rules, business metrics, audit logs, device data, or the like. In at least one of the various embodiments, data stores 352 may further include program code, data, algorithms, or the like, for use by a processor, such as central processing unit (CPU) 312 to execute and perform actions. In at least one of the various embodiments, at least some of data and/or instructions stored in data stores 352 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include data processing platform 354 web services 356, work streams 358, application templates 360, change streams 362, table processor 364, generated applications 366, or the like.

Web services 356 represent any of a variety of services that may be configured to provide content, over a network to another computing device. Thus, web services 356 include for example, a web server, a File Transfer Protocol (FTP) server, a database server, a content server, or the like. Web services 356 may provide the content over the network using any of a variety of formats, including, but not limited to WAP, HDML, WML, SGML, HTML, XML, compact HTML (cHTML), extensible (xHTML), or the like.

In one embodiment, web services 356 may provide an interface for accessing and manipulating data in a data store, such as data stores 352, or the like. In another embodiment, web services 356 may provide for interacting with data processing platform 354 that may enable a user to generate and/or access data processing applications that may be provided through network device 300.

In at least one of the various embodiments, work streams module 358, may be enabled to preserve changes made to generated data processing applications. In at least one of the various embodiments, change entries stored in work streams may be used for the rapid application development. In at least one of the various embodiments, a work stream may be implemented and/or referred to as an audit log.

In at least one of the various embodiments, data processing platform 354 may enable a user to generate applications, such as generated applications 366, that may include financial allocation models, budget models, cost objects, budget objects, budget items, allocation rules, establish calculation schedules, or the like. Also, in at least one of the various embodiments, data processing platform 354 may enable the automating of processes associated with the generation and/or use of financial allocation models. In at least one of the various embodiments, data processing platform 354 may generate data processing applications in accordance with at least one of the various embodiments.

Further, in at least one embodiment, templates 360 may enable the generation of applications where at least portions of the application may be based on pre-defined templates that may be processed and/or stored by templates application 360. Also, in at least one of the various embodiments, templates 360 may enable the rapid application development platform for generating various financial applications.

Moreover, web services 356, data processing platform 354, work streams 358, templates 360, change streams 362, and/or table processor 364 may employ processes, or parts of processes, similar to those described below and shown in FIGS. 4-18 to perform at least some of its actions.

Generalized Operation

Figure 4:
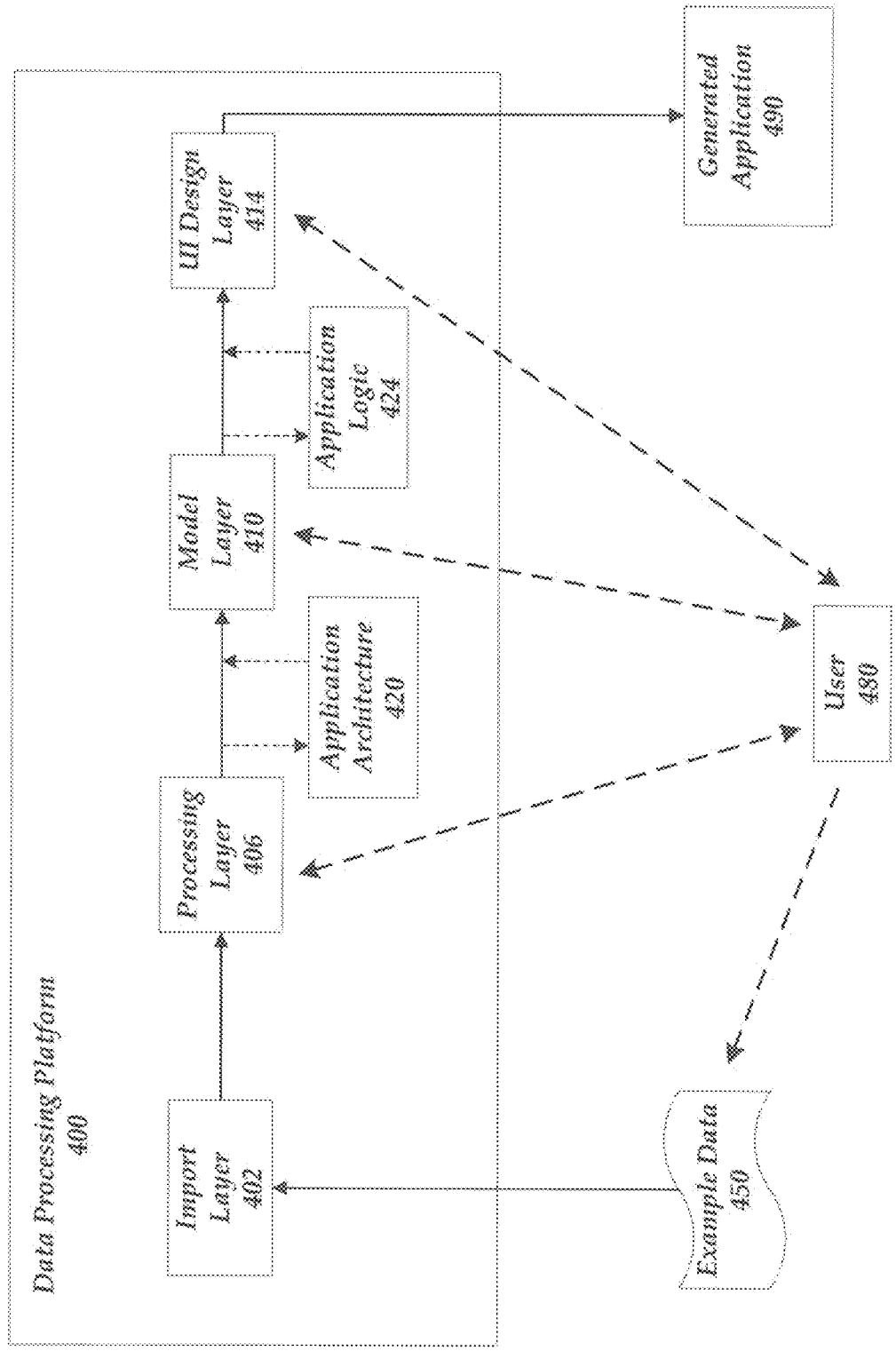
FIG. 4 illustrates a data processing system adapted to facilitate the rapid development of a data processing application in accordance with the various embodiments.

FIG. 4 illustrates data processing platform 400 adapted to facilitate the rapid development of a data processing application in accordance with at least one of the various embodiments. In at least one of the various embodiments, data processing platform 400 may be included in data processing platform 354 that may be operative on network device 300.

In at least one of the various embodiments, data processing platform 400 may include a plurality of logical layers, (e.g., import layer 402, processing layer 406, model layer 410 and user-interface design layer 414). In at least one of the various embodiments, the logical layers of the data processing platform cooperate to produce the generated application.

In at least one of the various embodiments, there may be less or more logic modules in the platform that may be operative to perform rapid application development. For example, in at least one of the various embodiments, a single logic module may replace the functionality of processing layer 406, model layer 410 and user-interface design layer 414, or the functionality of user-interface design layer 414 may be performed by a plurality of logic modules. In at least one of the various embodiments, the functionality of import layer 402 may be integrated in the functionality of processing layer 406, and therefore the import layer 402 may not exist at all, may be temporarily deactivated, or may simply be bypassed in a specific implementation. In at least one of the various embodiments, data processing platform 400 may be configured dynamically, depending on the specific inputs, outputs and functionality desired.

In at least one of the various embodiments import layer 402 may receive example data 450. In at least one of the various embodiments, example data 450 may include financial or operational related data, asset lists, activity records (such as trouble tickets, system transaction logs or utilization/response time records), process/product/service declarations and descriptions, the like.

In at least one of the various embodiments, example data 450 may be in any format as long as the format may be recognized and may be processed by data processing platform 400. For example, in at least one of the various embodiments, example data 450 may be encrypted, compressed, or formatted in a data file that may comply with a specific file format (e.g., XML, CSV, TSV).

In at least one of the various embodiments, import layer 402 may be included in data processing platform 354. In at least one of the various embodiments, import layer 402 may use the human input interface 248. Further, in at least one of the various embodiments, import layer 402 may include or utilize the video display adapter 314.

In at least one of the various embodiments, at least a part of example data 450 may be received from a user. In at least one of the various embodiments, if transmitting example data 450 to import layer 402, a user may upload the example data in a file, input it through a graphical user interface, create it through a set of prompts presented to the user via a graphical user interface (e.g., via checklists, drop-down menus, input boxes and/or other data entry fields), email it, direct the platform to retrieve the data from a local or remote location, otherwise communicate it directly or indirectly to import layer 402, or through any combination of the foregoing.

In at least one of the various embodiments, a user may be presented with a file upload dialog box (e.g., user-interface screen or window) for use in uploading a dataset. In at least one of the various embodiments, the file upload dialog box may be used for the initial upload, and/or for subsequent updates of data, such as a table of data or another dataset. In at least one of the various embodiments, the file upload dialog box may have options for overwriting or appending to a dataset previously stored in the platform. In at least one of the various embodiments, a file upload dialog box may have an option for the time period into which the upload may take effect (e.g., an effective time period).

In at least one of the various embodiments, a graphical user-interface window may provide visual feedback to a user in connection with the validation of uploaded data. In at least one of the various embodiments, an update prompt may indicate that data validation may be in progress. In at least one of the various embodiments, a user may be notified if a data validation process has detected differences if compared against a preexisting dataset. A more detailed discussion of data validation in connection with embodiments of this invention is found in U.S. patent application Ser. No. 12/467,120 filed on May 15, 2009, entitled "Operational-Related Data Computation Engine", which is incorporated by reference into this patent application in its entirety.

In at least one of the various embodiments, during and/or after the example data may be uploaded into data processing platform 400, a user may utilize additional user-interfaces elements to selectively edit and/or modify the uploaded example data as necessary. In at least one of the various embodiments, such editing may be required to ensure that the uploaded data may conform to the requirements of the current application. Further, in at least one of the various embodiments, data items from the example data may be grouped and classified by a user through user-interfaces or the operation of rule based policies, custom scripts, mapping functions, or the like.

In at least one of the various embodiments, after receiving example data 450, import layer 402 may process at least part of example data 450. For example, in at least one of the various embodiments, import layer 402 may decrypt, decompress, transform into different formats, or otherwise process all or part of example data 450. In at least one of the various embodiments, import layer 402 may selectively extract only part of example data 450 and selectively ignore part of example data 450 (e.g., for example, import layer 402 may be configured or instructed to use only specific subsets of example data 450 depending on the specific types of data processing applications to be generated by data processing platform 400 or depending on the format of example data 450 and/or other applicable circumstances.

In at least one of the various embodiments, import layer 402 transmits at least part of example data 450, whether processed or unprocessed, to processing layer 406.

In at least one of the various embodiments, processing layer 406 may be adapted to generate transformed data from the imported example data. In at least one of the various embodiments, transformation may include hiding columns, adding columns, grouping columns, applying filters, or like.

In at least one of the various embodiments, user 480 may review the operation of processing layer 406 and/or may provide input to the processing layer 406 regarding the structure of the transformed data as part of preparing the application architecture 420 and/or the process to be used to produce application architecture 420. (This type of interaction may be indicated by the dotted arrows shown in FIG. 4.)

In at least one of the various embodiments, model layer 410 may be used for generating at least part of application architecture 420 using data provided by processing layer 406. In at least one of the various embodiments, model layer 410 may be further adapted to generate application logic 424 that may be based on at least part of application architecture 420. In at least one of the various embodiments, model layer 410 may be used to generate one or more models representing the data, objects, and rules for the operation of the generated application.

In at least one of the various embodiments, application logic 424 may include logic modules or other structural components, such as software modules, software routines, references to external logic modules or data processing systems with the ability to engage such external logic modules or data processing systems to process data, references to external logic modules with the ability to receive data from such logic modules or data processing systems, application programming interfaces adapted to communicate with external logic modules or data processing systems, or other data processing components or systems, or the like.

Further, in at least one of the various embodiments, application logic may include rules that determine how other parts of the model interact and/or relate to each other. In at least one of the various embodiments, users may use the data processing platform to create and/or modify these rules that may be of the application logic.

In at least one of the various embodiments, as part of generating application logic 424, model layer 410 may employ processes as further described in connection with the embodiments of FIGS. 5 and 6.

In at least one of the various embodiments, user 480 may review the operation of model layer 410 and/or may provide input to the model layer 410 regarding the structure of application logic 424 and/or the application logic 424. (This type of interaction may be indicated by the dotted arrows shown in FIG. 4.)

In at least one of the various embodiments, user-interface design layer 414 may apply at least part of application logic 424 and application architecture from model layer 410. In at least one of the various embodiments, user-interface design layer 414 may be adapted to generate user-interface reports and components for use by users of data processing application 490 based on at least part of the processed data, application architecture 420, models, and application logic 424.

In at least one of the various embodiments, data processing platform 354 may be used as a platform for rapid generation and/or rapid development of applications that may be operative singly or in combination to perform one or more of the following functions:

Customized Cost Measurement and Analysis.

In at least one of the various embodiments, a data processing application may have the capability to build custom financial models for cost distribution through cost pools, cost drivers and cost objects, and the ability to run ad-hoc queries on the results of those calculations along various dimensions, such as time, cost category or tracing how a particular cost line item flows through the financial model.

Information Technology Financial Management.

In at least one of the various embodiments, a data processing application may encompass many aspects of managing the finances of information technology departments and may include custom financial cost models, automating a budgeting process, demand planning/forecasting, billing, vendor/supplier management, or the like.

Business Intelligence. and Reporting and Analytics.

In at least one of the various embodiments, a data processing application may have the capability to produce "Business Intelligence" that may be in the form of tables, data visualization charts, gauges, or the like, to aid the analysis of large sets of typically multi-dimensional data. In the existing and prior art, Business Intelligence solutions are generally hand-developed by teams of programmers and database administrators. But, at least one of the various embodiments may provide a rapid application development platform that may be used by business analysts to develop applications without requiring an advanced IT skill set.

Budgeting.

In at least one of the various embodiments, a data processing application may have the capability to automate the capture of budget information from budget owners within an organization and to mediate the multi-phase negotiation process that may result in an approved and locked budget for subsequent fiscal periods. In at least one of the various embodiments, data processing applications may involve one or more of the following:

(a) one or more custom screens containing editable tables for budget owners to enter expected expenses in a variety of forms, including direct line items, new purchases that must be depreciated, expected labor use, etc. (such data may be entered in hours, number of full-time-employees or other appropriate measurement units); and (b) a customized workflow that may enable a budget to be submitted, notifying one or more approvers of the submission, the application may allow the approvers to suggest changes, notifying one or more budget owners, approving the budget fully or partially, submitting the budget for additional levels of approvals, security features, or the like.

Forecasting.

In at least one of the various embodiments, if a budget may be created for a particular fiscal period (e.g., a year, quarter, month, or the like), a data processing application may provide a process for monitoring actual money spent against that budget as well as changes to the expected financial numbers or forecast.

In at least one of the various embodiments, the automation of such a process may include a cost entry capability, forecast adjustment capability and analysis, ad-hoc query capabilities, or the like, that may be used for analyzing the current status of the forecast against actual spend and budget. In at least one of the various embodiments, the cost entry capability may include one or more editable tables that may facilitate entry or adjustment of a budget, a complex financial model that transforms cost from a different source format, or the like. In at least one of the various embodiments, the source format may be a corporate general ledger system, or specific sub-ledgers. In at least one of the various embodiments, sub-ledgers may be kept within the system (e.g., the generated data processing application) and may be updated or changed as editable tables on a screen. In at least one of the various embodiments, sub-ledgers may be external to the data processing platform and may be loaded either manually or through an automated process that may be integrated with an external accounting/finance system.

Planning and Demand Forecasting and Management.

Budgets for shared services within companies (such as IT, Telecom or Facilities) may often be set in financial terms (e.g., "5% increase in storage costs"). Often, such financial terms are, at best, educated guesses. Demand Forecasting is a more disciplined approach that involves consumers of shared services estimate their expected usage in a subsequent fiscal period, and the estimated figures are then used to compute the financial ramifications, which impact the budget requests, for the shared service. For example, instead of "5% increase in storage cost", with a Demand Forecasting approach, seventeen different departments may enter information in a form similar to "Hiring 10 new executives and 90 new knowledge workers".

In response to such a Demand Forecasting data entry methods, in at least one of the various embodiments, a data processing application may have the capability to use a financial model that may employ assumptions, policies and historical information to calculate that one of the services employees will use is email, that executives generally use 5 GB (gigabytes) of email storage in their first year, and that knowledge workers generally use 2 GB of email storage in their first year. In at least one of the various embodiments, based on such an analysis a data processing application may calculate the total amount of additional storage necessary in GB as a result of these expected personnel additions. In at least one of the various embodiments, a data processing application may be able to calculate that the variable unit rate of Tier 1 storage (such as may be used for email) is currently $0.33/GB and thus calculate one slice of the additional budget requirements for storage in the next fiscal period. In at least one of the various embodiments, these capabilities of data processing applications may apply to many department services, such as "email", "CRM", "mobile phone", "laptop", and others. In at least one of the various embodiments, budgets produced by data processing applications may be more accurate and more defensible than an educated "5%" guess.

Billing, Showback and Chargeback.

In at least one of the various embodiments, a data processing application may include a capability to produce or "show" a bill for use of shared corporate services (such as IT or telecom). In at least one of the various embodiments, both the display of this bill and the production and review process of the bill may be automated using such an application. In at least one of the various embodiments, the display of the bill may be security controlled and redacted so that each individual can only see that individual's own bill. In at least one of the various embodiments, the billing process may be automated by, once the necessary inputs (costs and usage quantities for a particular billing period) have been entered, notifying the billing manager (typically someone in the finance group or a service manager) that the bills are ready for review. In at least one of the various embodiments, the billing manager may choose to review each bill, make adjustments or add comments, and then "publish it", whereby the application can make it available to and notify the recipient that the bill is ready. In at least one of the various embodiments, the recipient can "accept" the bill or dispute it (e.g., initiate an inquiry). In at least one of the various embodiments, the billing manager may be notified of disputes and a workflow may be customized for handling any recipient who does not accept a bill within a certain amount of time. In at least one of the various embodiments, actions taken in this circumstance may vary from automatically accepting the bill, initiating a notification to a manager, entering into any other designed/customized workflow, or the like. In at least one of the various embodiments, if bills have been accepted, in a chargeback scenario, entries may be automatically or manually posted into an external general ledger (GL) accounting system, or the like.

Project Portfolio Management.

In at least one of the various embodiments, a data processing application may include the ability to automate a customizable process of accepting project proposals, and may run such proposals through a review/approval workflow (e.g., accepting different input parameters from various stakeholders along the way). In at least one of the various embodiments, once a project begins, the automation may include both the tracking of the project's execution, including progress against goal and costs incurred (including in terms of labor hours, capital, and operational and other expenses). In at least one of the various embodiments, the application presents and enables analytic/ad-hoc questions against the current "portfolio" of active and proposed projects along axes such as risk, expected ROI and investment/cost/effort.

Time Tracking and Labor Management.

In at least one of the various embodiments, a data processing application may automate the collection of time tracking information from employees or contractors of an organization, along with a variety of best practice management reports about them. In at least one of the various embodiments, this information may be integrated into other applications, such as for Project Portfolio Management (to track incurred costs of a project) or Service Costing to track how much money is operationally being spent by the department on the various duties of employees. Many workers, but especially knowledge workers (as is prevalent in IT) have duties that vary on a day-by-day and week-by-week basis. Without an automated system to capture relevant operational data and analyze it, more advanced analytics about the operational performance of the organization tend to be so inaccurate as to be invalid.

In at least one of the various embodiments, a data processing application may generate advanced analytics by providing more accurate and relevant underlying data and analytics.

Vendor, Supplier and Cloud Management.

Vendor/Supplier management tracks and improves vendor, and respectively supplier chains. The general domain of vendor management may include the capture of agreements with vendors, collection of the ways in which an organization is using each vendor (including capture of utilization information), measuring and mediating the relative satisfaction of the organization with vendors, and associated analytics necessary to aid with negotiations and decision making with each vendor (including vendor rationalization, reduction and simplification).

In at least one of the various embodiments, a data processing application may import vendor pricing information and may import and calculate cross-industry benchmarks (that is, aggregates from other organizations) to aid with vendor negotiations or cost management.

As part of the transition to cloud-based data management, there has been a movement in the IT industry to a services (often Internet-delivered services) approach where vendor and supplier management becomes both more critical (e.g., more money may be involved) and more difficult as the central IT organization is not always involved by a decentralized decision making and/or outsourcing process. In such cases, in at least one of the various embodiments, a data processing application may provide and integrate additional data capturing and analysis to capture or audit asset and service usage (for example at the network layer). Additional, areas of vendor, supplier and cloud data management are described in more detail below.

Contract Management.

In at least one of the various embodiments, a data processing application may provide a system that maintains records of active and proposed contracts with third parties (such as other companies). In at least one of the various embodiments, details tracked may include the start and end date of a contract, identity-related data for the vendor who may be a party to the contract, the total monetary cost of the contract, or the like. Further, in at least one of the various embodiments, references into the Service Level Agreement (SLA) for the contract may also be maintained. In at least one of the various embodiments, a copy of the actual contract document may also be stored in electronic form, for reference or comparison purposes. In at least one of the various embodiments, as multiple stakeholders become involved in the approval, measurement (e.g., against SLAs) and ongoing maintenance of the contract, a data processing application may provide significant advantages for managing and facilitating this process.

Service Level Agreements (SLA) & Service Level Management (SLM).

Contracts may often be written to require certain levels of performance or quality. For example, a particular system might be contractually required to be available 99.999% of the time, or respond to requests, on average within 2 seconds. The calculations sometimes become complex (for example, a simple 99.999% uptime means that roughly 5 minutes of downtime may be permissible in a year). However, a service might require 99.999% uptime only during business hours. In such cases, computations may need to take into account working hours, weekends and locale specific public holidays, and other specific information in order to properly compute the percentage uptime achieved.

In at least one of the various embodiments, a data processing application may include a function that may be able to compute downtime duration for working hours. In at least one of the various embodiments, a data processing application may manage such details (e.g., what requirements relate to particular systems) and may calculate and model organization and/or system performance against SLA and/or SLM requirements, or the like.

Surveys.

In the absence of specific SLA requirements or of capabilities to capture the raw data for measurement against SLA requirements, in at least one of the various embodiments, a data processing application may be used to perform automated or substantially automated collection of survey forms from various stakeholders in an organization. In at least one of the various embodiments, such surveys may include an annual rating by employees of the performance of the IT department against qualitative goals such as "responsiveness" and "cost effectiveness" and "quality". In at least one of the various embodiments, such surveys may also include collecting specific feedback from internal stakeholders about particular vendors or suppliers as a part of Vendor/Supplier management.

Service Costing, Shared Services Allocations, and Service Portfolio Management (SPM).

In at least one of the various embodiments, a data processing application may provide an accurate financial model that transforms relatively-tangible costs (e.g., the cost of a new server, rent for a data center, or salary paid to an employee) into intangible, but more business-aligned services (e.g., the cost of an email account or a call into the IT helpdesk because a user forgot their password). In at least one of the various embodiments, this may be done by accepting the source input costs (e.g., in the form of a data from a General Ledger system) as well as activity allocation information (e.g., a list of all calls to the helpdesk, or all servers in the datacenter). The activity information may also include information about the purpose of the activity. For example, some servers might be used for servicing email, while others may be used for running helpdesk software. Some helpdesk calls are requesting password changes, others are to request help with a broken laptop. The costs may be broken down from their original source format into a cost per activity. For example, records may indicate that call #775 from 9:03 am to 9:10 am on Jul. 3, 2010 was a password change request. In at least one of the various embodiments, by looking at attributes of an individual call, such as duration or priority, and following allocation rules, an data processing application may calculate costs as $5.00 comprised of $0.80 for a portion of the costs to run the servers supporting the helpdesk, and $4.20 for labor. In at least one of the various embodiments, if finished all the 'password change' ticket costs may be added together to calculate the total cost of the password change "Service".

Such a cost translation may be particularly valuable from a business decision making standpoint. For example, if $200,000/year is being spent to manually change users passwords, a business case may be made to procure an automated system for handling these requests. In at least one of the various embodiments, a data processing application may provide or facilitate SPM processes for the proposal, approval and initiation of entirely new services, benchmarking of service costs across many companies, and the ability to tag services in a variety of ways for further analysis, categorization, or the like. For example, in at least one of the various embodiments, services may be tagged as "grow" vs. "sustain" or "retire", or "operational" vs. "strategic". In at least one of the various embodiments, this may permit executives to understand, communicate and make better decisions about total spend and future investments.

In at least one of the various embodiments, in order to facilitate benchmarking and service rationalization (e.g., ensuring the same service is not inefficiently provided in multiple ways), services may also grouped into multiple, customizable categories. For example, in at least one of the various embodiments, "Email" and "Cellphone" may be grouped together into "Communications and Collaboration".

Profitability Analysis/Customer Profitability Analysis.

In at least one of the various embodiments, a data processing application may calculate a cost per customer or business unit. In at least one of the various embodiments, if this cost may be combined with revenue information, an application may calculate customer or business unit profitability. In at least one of the various embodiments, such computations may not be limited to IT organizations or data, but, in at least one of the various embodiments, may also be used to judge the effectiveness of marketing programs against particular customer segments, or, and at a higher level, may be used for all functions in an entire business in virtually any industry. For example, in at least one of the various embodiments, an application may assist a travel management company to calculate the costs of running each of its websites (including consumer facing websites and websites for particular resellers, large customers or the government), and combine that cost with the marketing costs of promoting each website in order to produce total costs per function.

In at least one of the various embodiments, by also measuring the revenue from each website and tracking historical performance, a data processing application may enable further strategic business, operational and organizational analysis.

Request Management.

In at least one of the various embodiments, a data processing application may be used to automate the capture of requests for services. In at least one of the various embodiments, such a request for services may take the form of a "new request" screen that may add a single row into a request table, where the user may fill out certain data fields.

In at least one of the various embodiments, the data received through such a request may then be fed into an "approval and action" workflow where the change request may be approved and may be assigned to the individuals or systems that may be responsible for effecting a related change.

Service Catalog.

In at least one of the various embodiments, a data processing application may utilize a service catalog (denoted a "Service Catalog"). In at least one of the various embodiments, may be configured as a list of services that may be available for browsing or searching by users. In at least one of the various embodiments, the Service Catalog may be organized into multiple category dimensions. In at least one of the various embodiments, additional information about the respective services may be included in one or more editable tables, such as a description, a human owner, related service level or quality agreements, criticality, status, or the like.

Asset Management.

In at least one of the various embodiments, a data processing application may provide a system that may keep track of asset purchases and leases (e.g., server/storage/networking hardware, software licenses, etc.), their financials (e.g. depreciation), operating metrics (e.g., expected lifespan), where such assets are or will be provisioned in the organization, or the like. In at least one of the various embodiments, an application may also track other operational metrics such as utilization and quality.

Financial Modeling.

In at least one of the various embodiments, a data processing application may be used for general purpose financial modeling. In at least one of the various embodiments, the application may provide a financial tool similar to a traditional spreadsheet, but without most of a spreadsheet's limitations.

In a traditional spreadsheet, models may be built a single cell at a time, and for a large enough set of rules, this may become both repetitive and difficult to track (e.g., it may be difficult to track any exceptions to general rules). In at least one of the various embodiments, a data processing application may permit building models with a visual, graphical model. In at least one of the various embodiments, the model may include propagation rules that apply over multiple (e.g., millions) of cells.

In a traditional spreadsheet, formulas may be typically expressed using cell location (such as "A7*$B$9". In at least one of the various embodiments, a data processing application may permit more intuitive representation of formulas, such as "Cost*ExpectedReturn".

In a traditional spreadsheet, additions or changes to the dimensions modeled requires a lot of tedious work to rebuild dependent parts of the model. In at least one of the various embodiments, a data processing application may use objects and object-agnostic metric formulas, which may permit building financial models that may be more resilient. In at least one of the various embodiments, the notion of "time" may be pre-built into the application, significantly reducing the effort involved on one of the most complex dimensions of financial modeling.

In at least one of the various embodiments, a data processing application may provide the capability to capture changes to a project from multiple users and may make such changes auditable and undoable (e.g., in case there are problems). In at least one of the various embodiments, such changes may be applicable to change entries and change stream processes, as further described below.

Collaboration with a traditional spreadsheet typically involves emailing multiple versions of spreadsheets between users and normally requires human intervention in merging changes from multiple users together. In at least one of the various embodiments, a data processing application may provide a user interface delivered using a thin client and a back-end server architecture (e.g., over a website, or over a mobile device such as a smart phone), so changes from multiple users can be merged and synchronized in substantially real-time.

In at least one of the various embodiments, a data processing application may provide Row-level security and Cell-level security using a set of filter rules.

In at least one of the various embodiments, user 480 may review the operation of the user-interface design layer 414 and/or may provide input to the user-interface design layer 414 regarding the structure of the data processing application 490 and/or the process to be used to produce/generate the data processing application 490. (This type of interaction may be indicated by the dotted arrows shown in FIG. 4.)

In at least one of the various embodiments, data processing application 490 may be hosted on a server and accessible by users remotely (e.g., in a cloud computing application), or may be downloadable in whole or in part to a user's personal computer, may operate in a web browser, or may otherwise run locally or remotely relative to the user. In at least one of the various embodiments, data processing application 490 may be specific to a particular user (e.g., a software application configured to be used by a single user using specific credentials). Also, in at least one of the various embodiments, data processing application 490 may be configured to be used by a plurality of users.

In at least one of the various embodiments, data processing application 490 may serve as the basis for a platform-as-a-service (PAAS) user application environment. In at least one of the various embodiments, data processing application 490 may be hosted on one or more servers, or may be offered from a cloud computing system, and may be accessed by users who may establish connections from remote data processing systems (e.g., computers, thin clients, mobile devices, etc.). In at least one of the various embodiments, the users may use the data processing application 490 to build one or more applications. In at least one of the various embodiments an application built using data processing application 490 configured as a PAAS may itself be offered as software-as-a-service (SAAS) hosted on one or more servers or deployed in a cloud computing system.

In at least one of the various embodiments, data processing platform 400 and the generation of data processing application 490 may be achieved using a concept engine. An example of a concept engine that may be used in connection with various embodiments may be found in U.S. patent application Ser. No. 12/467,120 filed on May 15, 2009, entitled "Operational-Related Data Computation Engine," which is incorporated by reference into this patent application in its entirety. In at least one of the various embodiments, a concept engine may perform functions associated with the schema generator 658, fully linked tables 664 and interaction screens 668 discussed in connection with FIG. 6.

At least one advantage of generating a data processing applications using an embodiment similar to the one described in connection with FIG. 4 may enable a user to develop software applications using limited or no programming experience or software development expertise, in an accelerated timeframe.

Figure 5:
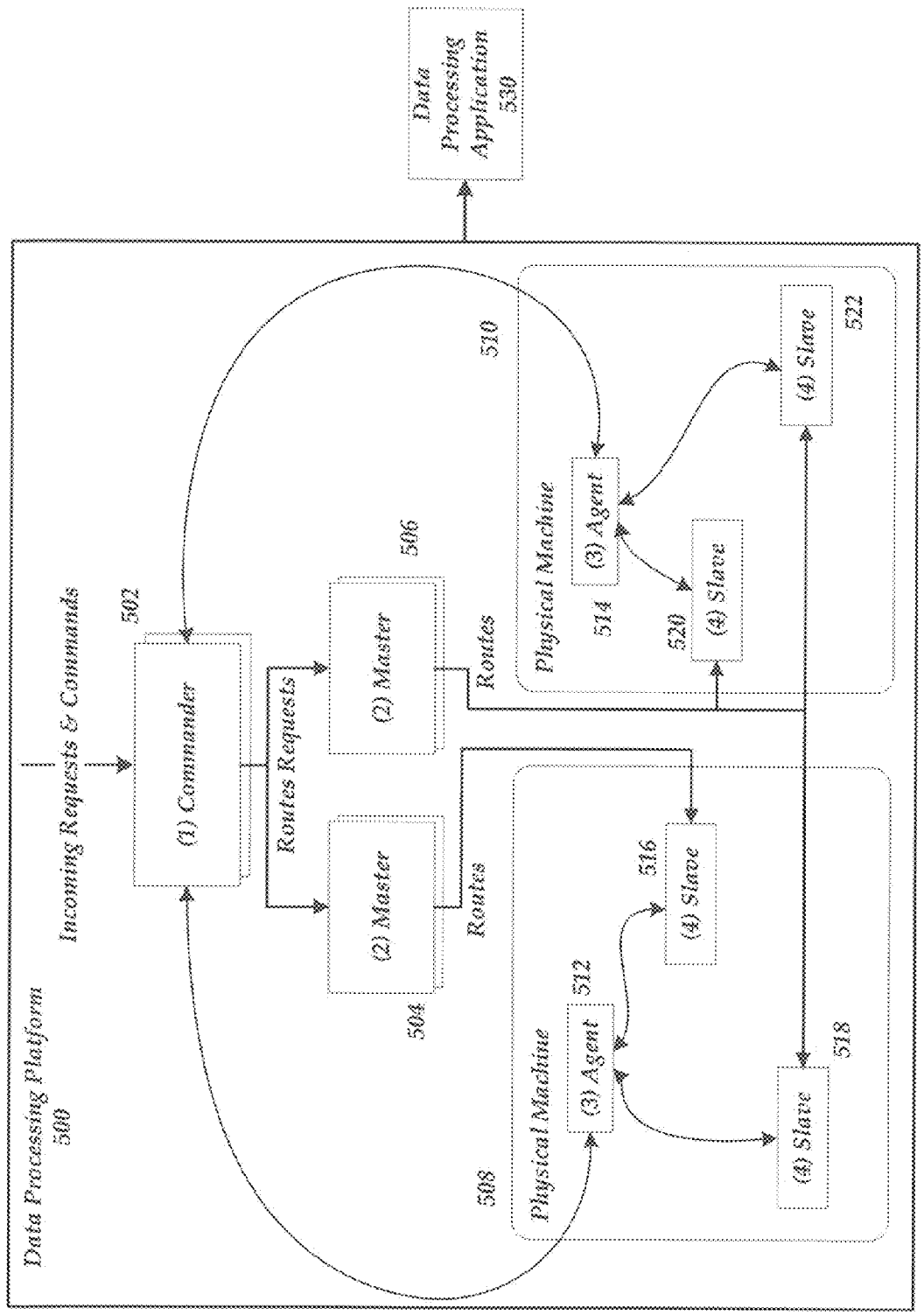
FIG. 5 shows an architectural structure of a data processing system configured to facilitate the rapid development of a data processing application in accordance with the embodiments.

FIG. 5 shows an architectural structure of data processing platform 500 for at least one of the various embodiments, configured to facilitate the rapid development of a data processing application 530 in accordance with at least one of the various embodiments of the invention. In at least one of the various embodiments, data processing platform 500 may be included in data processing platform 354 and data processing application 530 may be substantially similar to data processing application 490 from FIG. 4.

In at least one of the various embodiments, data processing platform 500 may include one or more commanders 502 (only one shown), one or more master modules 504 and 506, and one or more physical machines 508 and 510, which may collaborate to achieve the data processing functionality that the data processing platform 500 may employ to generate one or more data processing applications 530.

In at least one of the various embodiments, commander 502 may be a commander logic module that may accept one or more incoming requests from humans (e.g., from user 480) or machines and may route the request to one or more of masters 504 and 506. In at least one of the various embodiments, the human request may be formatted in any format suitable for input into a data processing system (e.g., request may be read from a database populated with the assistance of a human, may be received from a keyboard or other input terminal or GUI, or the like).

In at least one of the various embodiments, commander 502 may also manage and monitor the available resources of data processing platform 500 (e.g., spare "space" on physical machines) and may respond to resourcing requests from one or more of masters 504 and 506 to instruct agents included in physical machines to launch new slaves.

In one implementation, each of masters 504 and 506 may be a master logic module that may hold a meta definition of data processing application 530 and may coordinate available processing resources of data processing platform 500 to generate and/or execute data processing application 530.

In at least one of the various embodiments, each of physical machines 508 and 510 may perform data processing functions at least in part at the direction of one or more of master 504, master 506, and commander 502.

In at least one of the various embodiments, physical machines 508 and 510 may include, generate, or control, one or more agents (e.g., agent 512 and agent 514) and one or more slaves (e.g., slaves 516, 518, 520, and 522). In at least one of the various embodiments, each of agents 512 and 514 may be configured to launch slave nodes or processes (e.g., slaves 516 and 518, and respectively slaves 520 and 522), that may monitor the health of such slaves, to restart such slaves, and to inform commander 502 and/or master 504 or respectively 506 how busy the slaves are for load balancing purposes.

In at least one of the various embodiments, at least one of slaves 516, 518, 520 and 522 may be configured to generate and/or execute versions of data processing application 530. In at least one of the various embodiments, once generated, data processing application 530 may run on a single or multiple slaves, depending upon the generated applications size and workload.

In at least one of the various embodiments, each of commander 502, masters 504 and 506, physical machines 508 and 510, agents 512 and 514, and slaves 516, 518, 520 and 522 may be data processing modules that may be implemented as software applications or software modules, or as a combination of software and hardware. In at least one of the various embodiments, the functionality of two or more of commander 502, masters 504 and 506, physical machines 508 and 510, agents 512 and 514, and slaves 516, 518, 520 and 522 may be consolidated into a single data processing system or data processing module.

Figure 6:
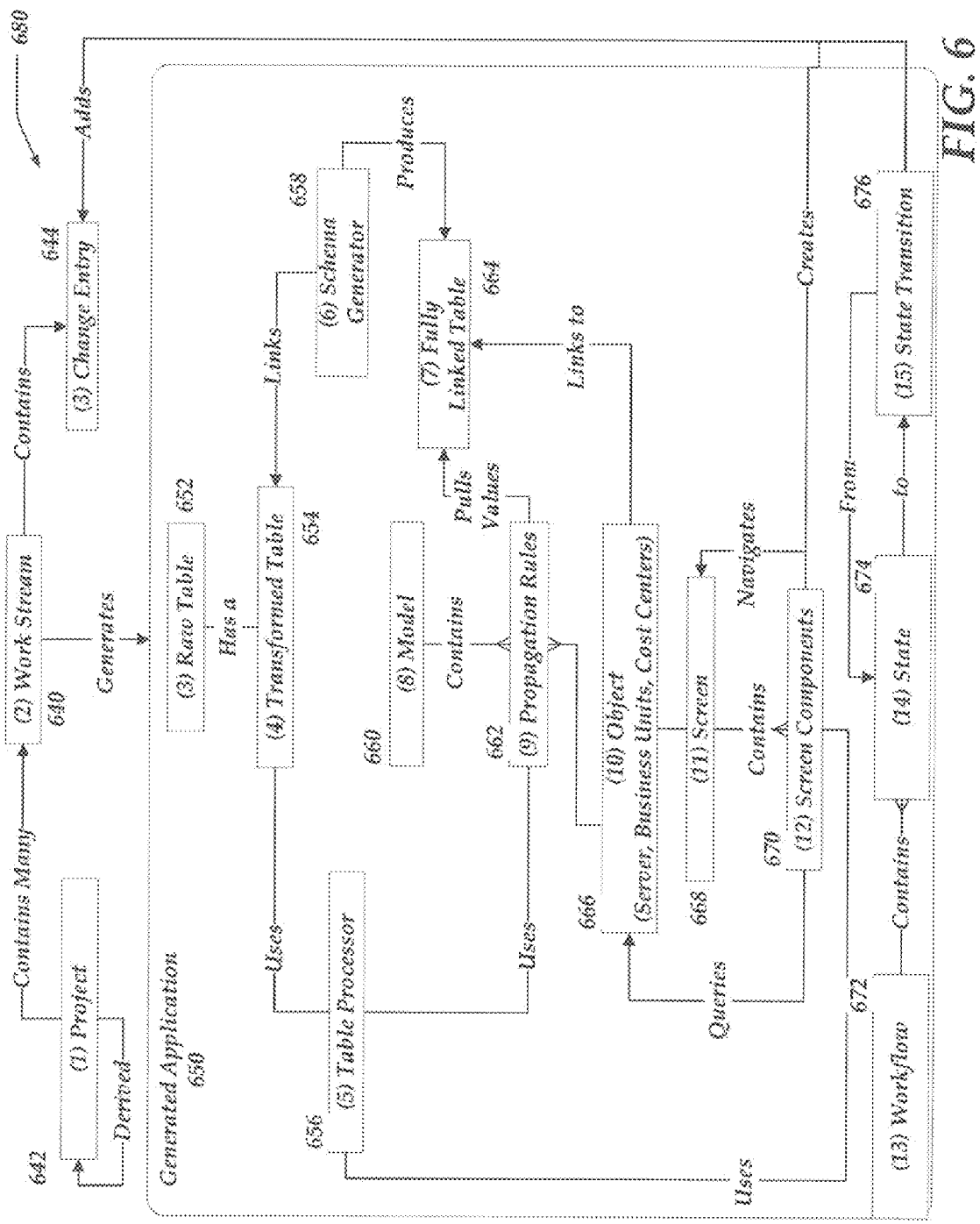
FIG. 6 shows a flowchart for a process that may be used to facilitate the rapid development of a software application for at least one of the various embodiments.

FIG. 6 shows a flowchart for process 680 that may be used to facilitate the rapid development of a generated application for at least one of the various embodiments. In at least one of the various embodiments, data processing platform 500 from FIG. 5, data processing platform 400 from FIG. 4, (also known the platform or platforms) may be used to run one or more software applications configured to execute process 680.

In at least one of the various embodiments, process 680 may includes at least one work stream 640 that may generate application 650. In at least one of the various embodiments, process 680 may rely on one or more projects 642, where each project may include a project definition and other descriptive or characteristic data.

In at least one of the various embodiments, each project 642 may include, or may interoperate with one or more change streams. In at least one of the various embodiments, a change stream may include a set of changes made by one or more users. In at least one of the various embodiments, changes may be modifications to previous data input into the platform and may sometimes be described as "change entries."

In at least one of the various embodiments, work stream 640 may be designated as a "master," or "parent" and may be used to produce application 650, which may be described as a "primary application," or "parent project," or read and write version of the produced/generated application. In at least one of the various embodiments, a read-only version of the primary application can be made available to one or more users for normal use that are not granted permission for accessing application development tools. In at least one of the various embodiments, changes to application 650 may be made, evaluated and tested against a different work stream, and such changes may be merged back into the master work stream and deployed as part application 650 if they may have been approved.

In at least one of the various embodiments, work streams record the changes and/or modification that may be associated with a generated application. In at least one of the various embodiments, work streams may be comprised of a plurality of individual change entries that may be preserved in an audit log.

In at least one of the various embodiments, as edit and/or modifications may be made to a generated application the work stream associated with application received change entries associated with the edit and/or modifications made to the generated application.

In at least one of the various embodiments, a user-interface may be arranged to be enable the user modify properties of the generated applications where each user-interface generated modification may be preserved in the work stream associated with the generated application.

In at least one of the various embodiments, an application may be generated and modified automatically by adding one or more change entries or modifying existing change entries to generate a modified or customized application. In at least one of the various embodiments, new or modified change entries may propagate and may automatically modify other dependent items, including one or more of the elements that may be included in application 650. In at least one of the various embodiments, propagation of new or modified change entries and subsequent refinement of application 650 may be illustrated in process 680 with the feedback loops that may be formed by screen components 670 and may feed back into change entry 644 and state transition 676 and may further feed back into change entry 644.

In at least one of the various embodiments, application 650 may receive multiple input datasets from various sources.

In at least one of the various embodiments, application 650 may comprise a number of logic modules.

In at least one of the various embodiments, transformation rule sets may be included that may affect the input data and may produce transformed input datasets.

In at least one of the various embodiments, table processing subsystem 656 may be configured to annotate, filter, summarize and/or combine data tables in a variety of ways. In at least one of the various embodiments, data tables may include raw table 652 and transformed table 654. In at least one of the various embodiments, transformed table 654 may be included in raw table 652, or may be produced by table processor 656 based on raw table 652. In at least one of the various embodiments, raw table 652 may include input datasets, and transformed table 654 may include transformed datasets.

In at least one of the various embodiments, schema generator 658 may be configured to automatically compute relationships between transformed input datasets.

In at least one of the various embodiments, one or more fully linked tables may be included, which may be generated using schema generator 658 and may be based on propagation rules 662 and transformed table 654.

In at least one of the various embodiments, application 650 may include, a set of metric models 660, which may include one or more objects 666 and may include one or more propagation rules 662.

In at least one of the various embodiments, application 650 may also include, a set of propagation relationships established between objects 666 that may be based on propagation rules 662.

In at least one of the various embodiments, application 650 may include, a set of object declarations that may be based on objects 666 and that may include properties that may be obtained from the fully linked tables 664.

In at least one of the various embodiments, application 650 may include, a set of interaction screens 668 that may be related to one or more instances of objects 666 and that may include one or more screen components 670. In at least one of the various embodiments, screen components 670 may have various capabilities for facilitating user actions, including navigation, data queries, data changes, or the like.

Additional discussion of schemas and generation of schemas (e.g., using the schema generator 658), fully linked tables (e.g., such as fully linked tables 664) and interactive screens (e.g., such as screen 668) may be found in U.S. patent application Ser. No. 12/467,120 filed on May 15, 2009, titled "Operational-Related Data Computation Engine," which is incorporated by reference into this patent application in its entirety.

In at least one of the various embodiments, application 650 may include a set of workflow models that may consist of possible activities and transitions between the activities.

In at least one of the various embodiments, application 650 may include a scheduler that may be configured to evaluate and/or trigger transitions periodically, such as state transitions 676.

In at least one of the various embodiments, application 650 may include a set of action items that may be arranged to concurrently execute instantiations of a workflow 672 that may generate one or more states 674 that may be related to the state transitions 676. In at least one of the various embodiments, the results of state transitions 676 may be used in a feedback loop to produce one or more change entries 644.

In at least one of the various embodiments, a table processor (e.g., table processor 656) may accept as input a transformation specification and an input table. In at least one of the various embodiments, the table processor may use at least these two inputs to produce an output table for further processing in the platform.

In at least one of the various embodiments, a table processor, such as table processor 656, may have one or more of the following capabilities including, Filtering (e.g., removing rows from the input table based on some specification, like "Cost>500), Pivot:/Unpivot (e.g., Converting between two canonical table forms), Limiting (e.g., only returning the first X number of rows, or a ranges of as in rows X through Y), or the like.

In at least one of the various embodiments, a table processor, such as table processor 656, may include one or more transformation types, including, Aggregation (e.g., multi-period, including awareness, ticket count, and new unit handling/re-grouping), Trend, Filter, Total/Group, Awareness of formula components, New Column, including formula syntax (particularly fully linked table syntax), Pivot/Unpivot, Transpose, Limit, Sort, Project, or the like.

Figure 7:
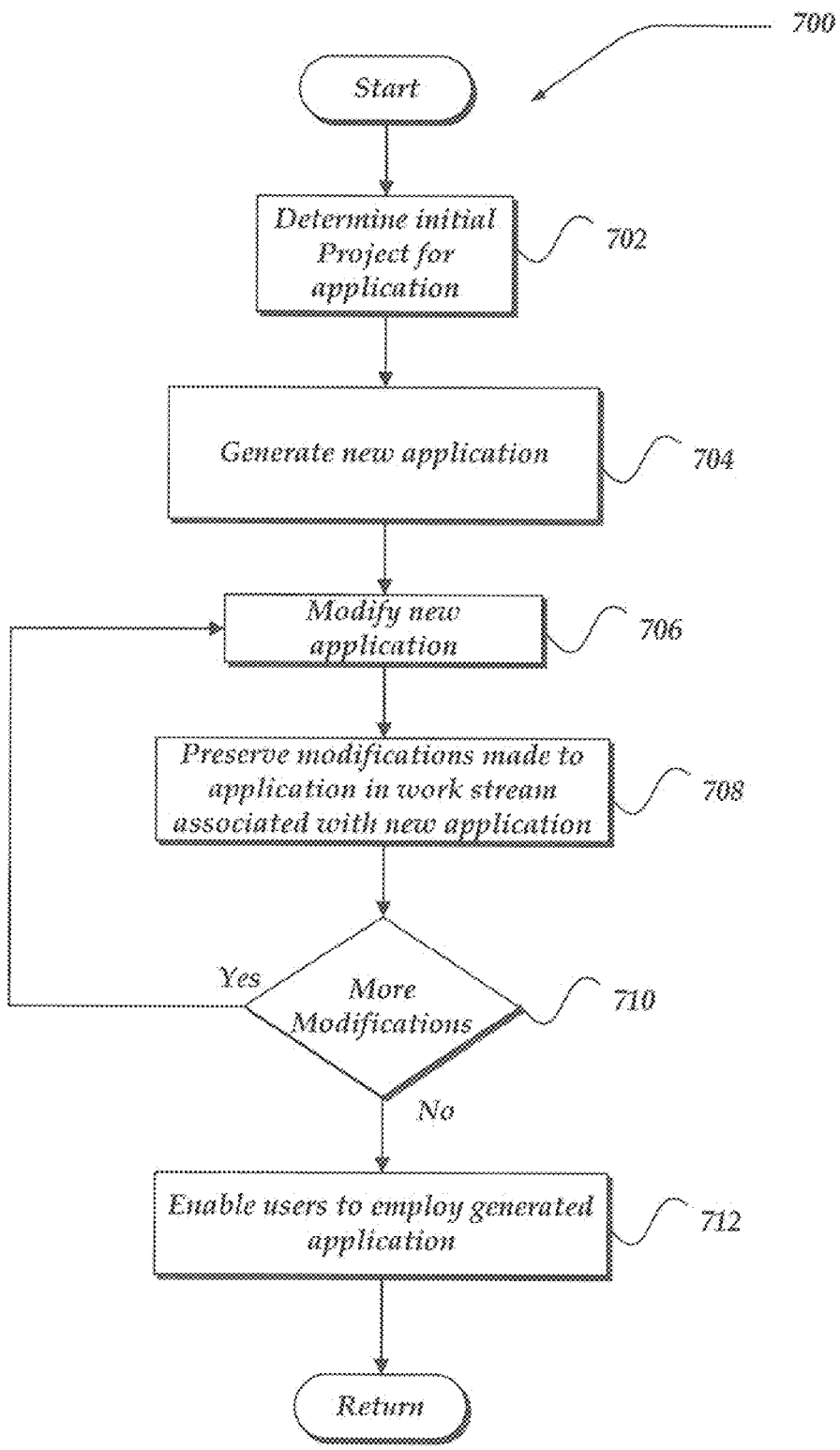
FIG. 7 shows an overview flowchart for a process for rapidly development of a data processing application in accordance with at least one of the various embodiments.

FIG. 7 shows an overview flowchart for process 700 for rapidly developing a data processing application in accordance with at least one of the various embodiments. After a start block, at block 702, in at least one of the various embodiments, a project may be determined for the new application. In at least one of the various embodiments, projects may be associated with initialization instructions and/or configuration parameters that may influence characteristic of the new application. In at least one of the various embodiments, a project may be associated with particular application templates, data types, work streams, other applications, user access level (e.g., user permissions), or the like. In at least one of the various embodiments, a user may associate project information used to generate the new application as required in advance of generating the new application. For example, in at least one of the various embodiments, a user may want to associate additional and/or different templates with the project before generating a new application.

At block 704, in at least one of the various embodiments, a new application may be generated based on the information associated with project. In at least one of the various embodiments, if the application may be based on previously defined work streams, such as from a template, the application may have a operative or semi-operative complex application architecture.

At block 706, in at least one of the various embodiments, if the new application may be generated based on the information associated with the project, the user may begin making modifications to the new application. In at least one of the various embodiments, a user may modify the generated application by transforming the example data, adding objects and relationships, creating models, generation rules, design user-interfaces and reports, or the like.

For example, in at least one of the various embodiments, if the new application may be a financial modeling application, a user may add cost objects and propagations rules that may represent elements of a financial model.

At block 708, in at least one of the various embodiments, modifications made to the new application may be preserved as change entries in a work stream that may be associated with the new application. In at least one of the various embodiments, modifications made to an application may cause the application to be associated with a new revision number.

At decision block 710, in at least one of the various embodiments, if additional modifications may be required control may loop back to block 706. Otherwise, control may move to block 712.

At block 712, in at least one of the various embodiments, a user may release the new application to the authorized user population so authorized users may begin using the application. Next, control may be returned to the calling process.

Figure 8:
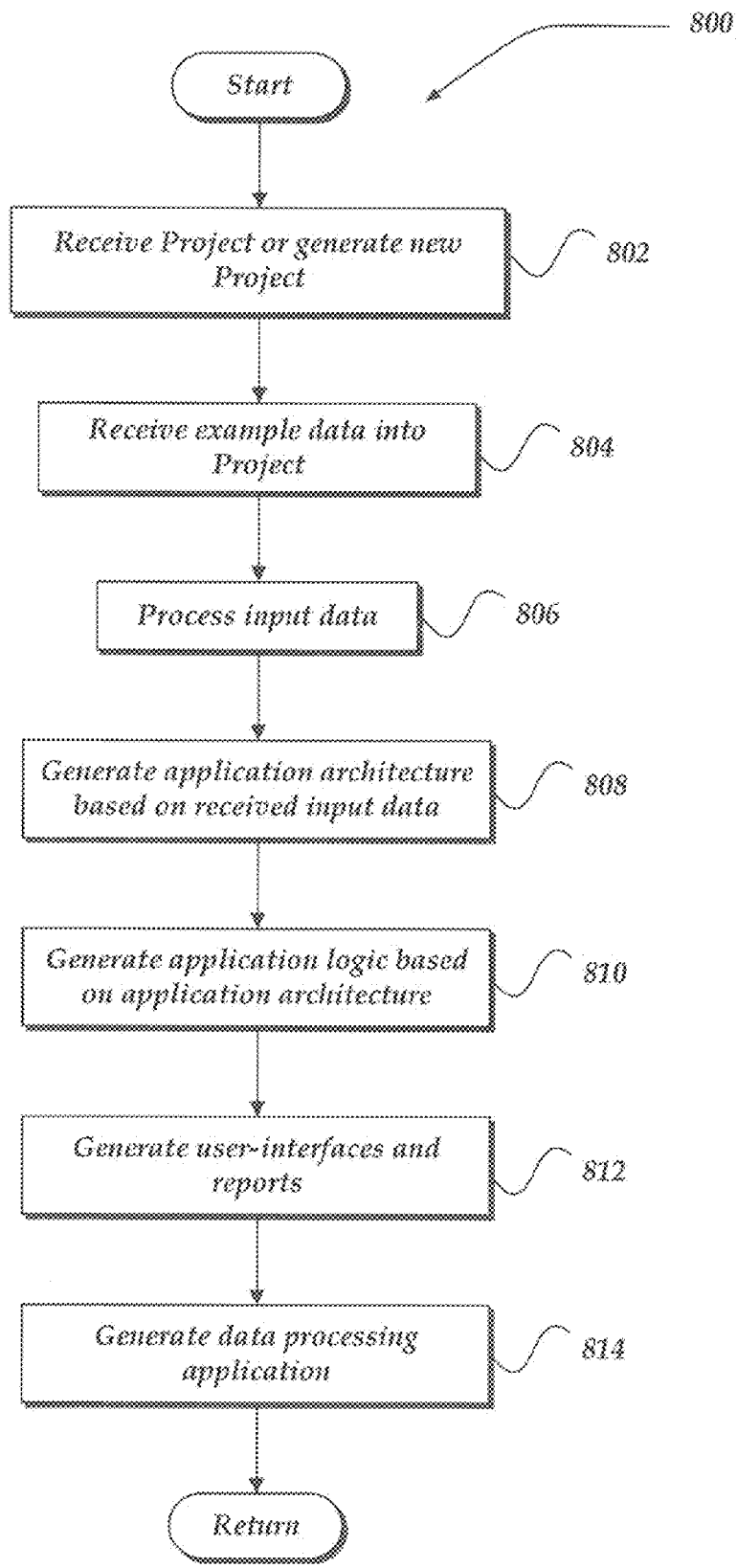
FIG. 8 shows an overview flowchart for a process for generating a data processing application in accordance with at least one of the various embodiments.

FIG. 8 shows a flowchart for process 800 for generating a data processing application in accordance with at least one of the various embodiments. After a start block, at block 802, in at least one of the various embodiments, a new project may be generated based in part on information the may be provided by a user. In at least one of the various embodiments, project information may include, project name, owner, description, or the like. In at least one of the various embodiments, project information may include associated predefined templates that may be applied if generating a new project.

In at least one of the various embodiments, project information may also include a reference to an existing project that may be used as template for generating the new project. In at least one of the various embodiments, project information may include references and/or association with one or more work streams and/or change streams that may be applied if generating a new project.

At block 804, in at least one of the various embodiments, process 800 may receive the example data. In at least one of the various embodiments, the example data may be imported by way of import layer 402 into process 800 by applying one or more of the various techniques discussed above. Further, in at least one of the various embodiments, during and/or after the data may be uploaded a user may transform, edit and/or modify the imported data. For example, in at least one of the various embodiments, some data fields in the uploaded data may be combined together. In at least one of the various embodiments, some portions of the received data may be discarded, reformatted, or the like.

Also, in at least one of the various embodiments, process 800 may report to a user that portions of the received data may be corrupt, missing, or otherwise unusable. In at least one of the various embodiments, a user may take corrective action to repair the received data if required and/or desired.

At block 806, in at least one of the various embodiments, the received data may be processed. For example, in at least one of the various embodiments, the data may be decrypted, decompressed, transformed into different formats, or the like. In at least one of the various embodiments, process 800 may selectively extract only part of the received data and selectively ignore part of the received data depending on the specific types of data processing applications to be generated and/or depending on the format of the received data and/or other applicable circumstances.

In at least one of the various embodiments, the imported example data may be stored in a raw data table. In at least one of the various embodiments, a transform table version of the data may also be generated. In at least one of the various embodiments, if the user modifies the imported data such modifications may be represented by the transform table that may be associated with the raw data table. For example, in at least one of the various embodiments, if columns are added, hidden, or combined or if rows are filtered, deleted, or added such modifications may appear in the transform table view of the data. In at least one of the various embodiments, the raw data table may remain unchanged if the transform may be modified.

In at least one of the various embodiments, the changes and modifications made to the transform table view of the raw data table may be stored as change entries in the work stream. Also, in at least one of the various embodiments, the transform table may be a view generated by executing recorded change entries against the raw data table rather that a container of the underlying data.

At block 808, in at least one of the various embodiments, process 800 may generate an application architecture based on the received and processed. In at least one of the various embodiments, the data processing platform may analyze the imported and transformed data to suggest objects and relationships to the user.

In at least one of the various embodiments, the user may select objects recommended by the data processing platform and/or generate new objects and add them to the generated application. In at least one of the various embodiments, objects may be based on the imported data. For example, if the imported raw data includes a list of servers, a user may want to create a Servers object as part of the application architecture.

Also, in at least one of the various embodiments, a user may create generic objects where the properties and contents of this type of user created object may be created using user-interface. For example, a "Bank Account" object may be created and a user may create property named "Balance" and initialize it a value of $100.

In at least one of the various embodiments, multiple objects may be added to a generated applications architecture based on adding a template to an application's architecture. In at least one of the various embodiments, templates may be associated with one or more objects, and if the template is added to an application, all of the objects associated with the template may be added as well.

In at least one of the various embodiments, the steps of generating an application architecture may contribute to generating a model that represents the problem space the generated application may be targeted for, such as financial model.

At block 810, process 800 may generate application logic based on the generated application architecture. In at least one of the various embodiments, application logic may include entity propagation rules. In at least one of the various embodiments, entity propagation rules may define how costs from cost object and/or other entities may be allocated to other cost objects and/or entities.

In at least one of the various embodiments, users may associate propagation rules with objects comprising the application architecture. In at least one of the various embodiments, each propagation rule may define how values from one application object relate and/or flow to other objects that may be in the generated application.

In at least one of the various embodiments, the generated application logic may be combined with the application architecture, objects, rules, and processed data to produce a model representing the problem space targeted by the generated application.

At block 812, in at least one of the various embodiments, a user-interface for the generated application may be generated. In at least one of the various embodiments, a user may select and define user interface components that may enable user's to access and/or interact with objects and data that may be employed in the generated application.

In at least one of the various embodiments, user-interface may include enabling users to add and/or edit data representing in the model.

In at least one of the various embodiments, user-interface and/or report components may be assigned user-level access conditions/restrictions. This may enable user-interfaces that show and/or make available user-interface and/or report components to users based on their individual or group access levels (or restrictions).

In at least one of the various embodiments, the user-interface components may be grouped into views or reports organized to provide related functionality and/or views to authorized users. In at least one of the various embodiments, views or reports may accessible and/or visible to designated users.

At block 814, in at least one of the various embodiments, the received and processed data, application architecture, models, application logic, and user-interfaces/reports may be combined to generate a data processing application. If the data processing application may have been generated, control may return to the calling process.

In at least one of the various embodiments, the generated application may be an application for budgeting and financial modeling, including, but not limited to the application types discussed above.

In various embodiments, project 642 and/or application 650 may be subjected to changes and/or modification that may be initiated by one or more users. In at least one of the various embodiments, such changes may be represented by change entry 644, where such changes may affect the states of project 642 and/or application 650.

In at least one of the various embodiments, changes to projects under development, to projects ready to be deployed and executed, to applications under development and to primary applications, and the like may be represented by using a change entry 644.

In at least one of the various embodiments, an advantage to having the similar representation for under-development and in-progress or deployed projects and applications may be that it may permit application 650 to evolve over time to meet changing requirements, yet still retain historical states for comparison, auditing, rollback purposes, and the like.

In one implementation, a change may be represented by change entry 644 and may be a fundamental unit of configuration for a generated application. In at least one of the various embodiments, there may be many possible types of change entries that may apply to an application. In at least one of the various embodiments, each type of change entry may accept a set of parameters and may operate on the logical structure of the generated application in some way. Examples, in at least one of the various embodiments, of change entries represented by change entry 644 may include the following:

"Bootstrap", in at least one of the various embodiments, this change may initialize the structure of the generated application and may often be the first change in a project.

"Save", in at least one of the various embodiments, change entries may be configured to directly affect generated application structure. For example, in at least one of the various embodiments, change entries may include: SaveObject, SaveTransformedTable, SavePropagationRule, SaveScreen. In at least one of the various embodiments, these change entries may be structured as "Saves" that may create an entity if the entity doesn't already exist in the generated application, and may edit it otherwise. In at least one of the various embodiments, a "Create" operation may be distinct from an "Edit" operation—so a stream of changes during application development may be "Create X→Edit X→Edit X→Edit X". In at least one of the various embodiments, if two individuals perform this work in separate work streams that may be later merged together, the second create may fails (because the object already exists), and subsequent edits referencing that particular create may also fail. In at least one of the various embodiments, a stream of "Save X→Save X→Save X", may be more useful for merging since the last save could represent the final state of the object.

"Delete", in at least one of the various embodiments, entries may be configured to remove entities (data tables, objects, models, etc) that may no longer be part of the application.

"Rename," in at least one of the various embodiments, entries may be configured to rename entities in a model, possibly together with other references that refer to them. For example, in at least one of the various embodiments, if a table may be renamed, references to that table inside a formula included in a model performing cost analysis on a data set may also be renamed automatically so that the rest of the application continues to function. In at least one of the various embodiments, this may allow an application developer to maintain the conceptual coherence of the generated application as it may be changed over time.

"Load Table," in at least one of the various embodiments, entries may be configured to load a table of raw data into the generated application, including into raw table such as ray table 652. In at least one of the various embodiments, a Load Table entry may be configured to override a table if the table already exists in the platform.

"Edit Table," in at least one of the various embodiments, entries may be configured to affect existing tables in the platform, but may not necessarily completely "overwrite" an existing table. Instead, in at least one of the various embodiments, an Edit Table entry may be configured to make smaller, tactical changes to the tables, such as changing or deleting a particular row.

In at least one of the various embodiments, an Edit Table entry may be structured using primary keys to ensure that edits to different parts of tables handle Undo and work stream merge operations gracefully. In at least one of the various embodiments, this may be enables by indexing changes in a table by row numbers. In at least one of the various embodiments, a work stream may be configured with commands such as "Delete Row 5" and "Edit Row 6." If "Delete Row 5" may be subsequently undone, however, what was row 6 if that change was originally logged may become row 7. In at least one of the various embodiments, a similar situation may occur if two separate work streams may be merged together using such an approach where changes are indexed by row numbers. In at least one of the various embodiments, an improved approach, instead, may provide a solution by assigning to specific rows in the original table (whether to only some rows or to all rows of the table), upon original table upload, a globally unique identifier (GUID). In at least one of the various embodiments, a combination of user-id and current time (down to the millisecond) may be used to generate GUIDs for rows with a sequencing algorithm for conflicts. In at least one of the various embodiments, a Change Stream command could be recorded as "Delete Row sdfjkk13543280932", "Edit Row reuidfsjkldsf138903393". Consequently, in at least one of the various embodiments, a deletion may not change the primary keys of other (unrelated) rows. Also, the GUID may be generated using techniques beyond those describe herein. Generally, a GUID that may provide at least application level uniqueness may be sufficient.

"Apply Object Template," in at least one of the various embodiments, change entries may be configured to reference a plurality of changes in different and/or separate applications and may apply them to a particular generated application.

In at least one of the various embodiments, templates may be selected at an object level (e.g., object 666), since such objects may be configured as central building blocks around which a generated application may be designed. In at least one of the various embodiments, a template application that may be applied to a particular application may also add integrated content to other parts of that particular application, including raw tables (such as raw table 652), propagation rules (such as propagation rule 662), models (such as model 660), screens (such as screen 668), components (such as component screen components 670), and the like.

In at least one of the various embodiments, a template may be used to generate and/or further modify an application, such as application 650.

In at least one of the various embodiments, it may be advantageous to apply a template object (e.g., an object or other item or logic module included in a template) multiple times within a generated application. In at least one of the various embodiments, it may be necessary to reuse object templates if there may be nested hierarchies of the same entity. In at least one of the various embodiments, an object template may be an "IT Service" template. In at least one of the various embodiments, an IT service may have a flexible definition, and this definition may be comprised of other, more fundamental services.

For example, in at least one of the various embodiments, one IT service may be a "Call Center Desk", for $380/month. In at least one of the various embodiments, a 'Call Center Desk' may be defined as including other (more fundamental) services, such as "1 Desktop at $200/month", "1 Phone at $100/month", "1 Headset at $30/month", and "30 GB email package at $50/month". Further, in at least one of the various embodiments, the full cost of the "Email" IT Service may be defined in terms of "SAN Storage $3 per gigabyte per month", "15 Windows Server 2 way blades at $1,500 each per month", "Microsoft Exchange CAL at $12 per user per month", etc. In at least one of the various embodiments, we may have three tiers of the IT Service object with different names: "Business Service" (such as the call center desk), "Capability" (such as desktops, headsets, phones, etc) and "Foundational Service" (such as SAN storage space or windows servers in the datacenter)." In at least one of the various embodiments, the non-limiting example described here may apply to Service costing, but may also have other applications, including budgeting and demand forecasting.

In one implementation, to apply a template object multiple times within a generated application, a rename capability may be used if copying template items into the generated application. In at least one of the various embodiments, this capability may adjust external references to items in order to maintain link coherence if they may be renamed.

Figure 9:
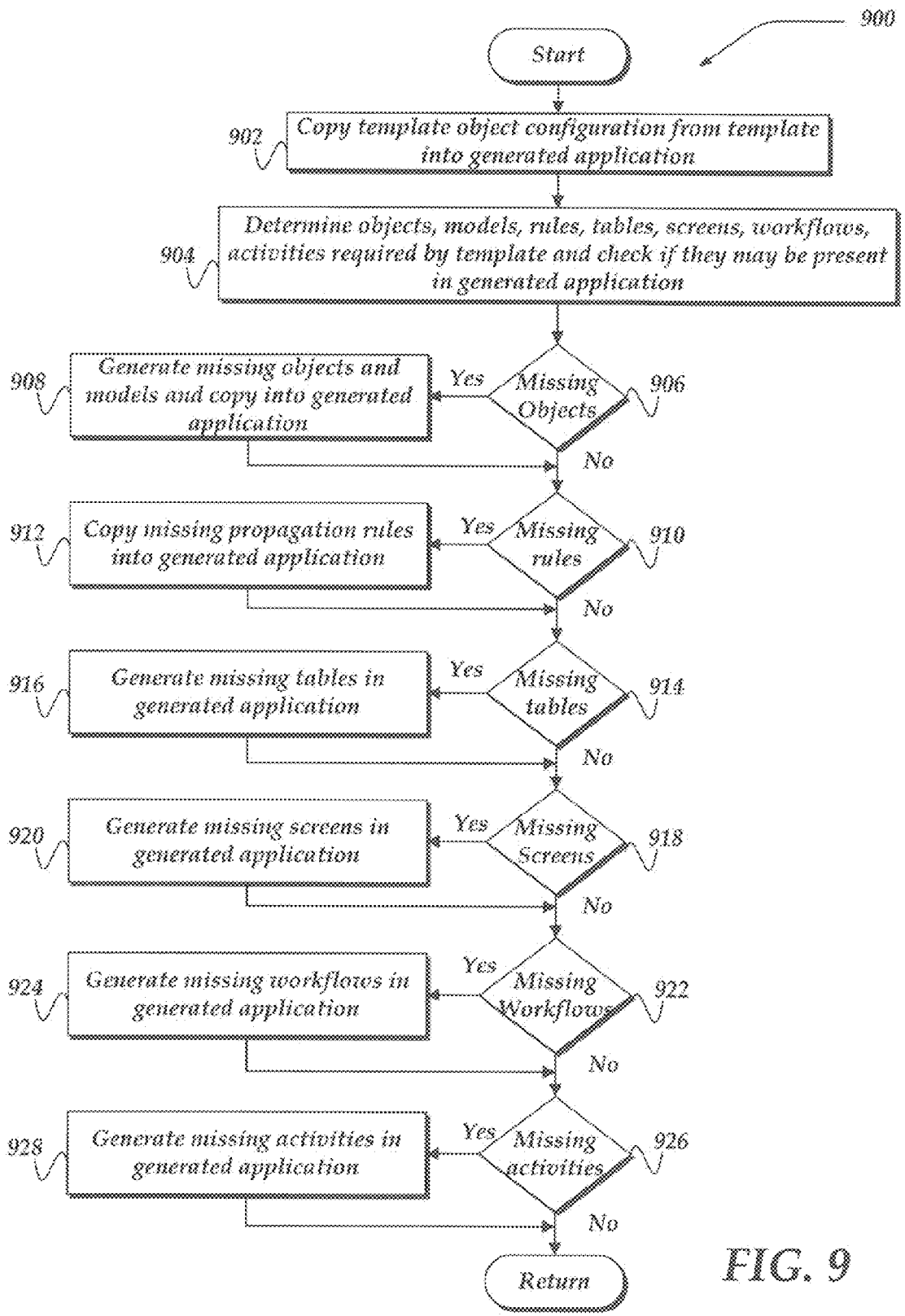
FIG. 9 shows a flowchart for a process for applying a template to a generated application in accordance with the embodiments.

FIG. 9 shows a flowchart for at least one of the various embodiments, for process 900 that may be used to apply a template to a generated application, such as application 650.

After a start block, at block 902, in at least one of the various embodiments, the template object's meta configuration may be copied from the template into the generated application. In at least one of the various embodiments, this may include a set of name-value pairs. For example, a "Computer" object may have a "Location" field with a value of "=ServerCMDB.DataCenter", indicating that the location of a particular computer may be found in the DataCenter column of the ServerCMDB data table.

At block 904, in at least one of the various embodiments, determine objects, models, rules, tables, screens, workflows, activities required by template and check if they may be present in generated application.

At decision block 906, in at least one of the various embodiments, if the required models (e.g., such as model 660) associated with the template object are not present in the generated application, control may move to block 908. Otherwise control may move to decision block 910.

At block 908, in at least one of the various embodiments, generate the missing objects and copy them into the generated application.

At decision block 910, in at least one of the various embodiments, if one or more of the propagation rules may be missing control may move block 912. Otherwise control moves to decision block 914.

At block 912, in at least one of the various embodiments, missing propagation rules may be copied into the generated application. In at least one of the various embodiments, propagations rules may depend on an object(s) and/or a table (s) that have not been copied and/or installed into the generated application. In at least one of the various embodiments, missing objects such as these may be installed before activating propagation rules that may depend on the missing object.

At decision block 914, in at least one of the various embodiments, if raw tables may be missing from the generated application, control may move to block 916. Otherwise, control may move to decision block 918.

At block 916, in at least one of the various embodiments, the raw tables associated with the template object (such as raw table 652) and transformation rules for those raw tables that may be associated with the template object may be copied into the generated application. In at least one of the various embodiments, the table may be renamed to use the name of the object inside the generated application. In at least one of the various embodiments, references to the original table name may be adjusted to the new name also—this may include formulas (e.g., inside propagation rules, screens, components, transitions, activities and other tables).

At decision block 918, in at least one of the various embodiments, if one or more screens (such as screen 668) and screen components (such as screen components 670) for this template are absent, control may move to block 920. Otherwise, control may move to decision block 922.

At block 918, in at least one of the various embodiments, screens and screen components may be generated that may be copied into the generated application to support the operating of the generated application.

At decision block 922, in at least one of the various embodiments, if workflows associated with the template are missing, control may move to block 924. Otherwise, control may move to decision block 926.

At block 924, in at least one of the various embodiments, workflows (such as workflow 672) associated with this template object may be copied into the generated application.

At decision block 926, in at least one of the various embodiments, if an activity(s) and/or a transition(s) associated with the template object is absent, control may move to block 928. Otherwise control may be returned a calling process.

At block 926, in at least one of the various embodiments, one or more activities and/or transitions (such as state transition 676) associated with the template object may be copied into the generated application. In at least one of the various embodiments, the activities and transitions may be renamed using the convention described for tables in connection with the discussion of change entries, such as change entry 644.

In at least one of the various embodiments, additional components and/or objects associated with a template but not present in a generated application may be tested for, and installed into the generated application. In at least one of the various embodiments, if generation of the application based on the template is successful, the generated application may be ready for operation or may require additional configuration and/or control may be returned to the calling process.

Further, in at least one of the various embodiments, one or more templates may be employed with an application at various points in the application's lifetime. For example, in at least one of the various embodiments, a template may be employed to initially create and/or generate an application. Also, in at least one of the various embodiments, a template may be applied later to modify and/or extend an existing application.

In at least one of the various embodiments, an 'Apply Object Template' change entry may record the template name and version to apply. In at least one of the various embodiments, if the change entry may be applied to the generated application, the actual configuration of the template may be read and copied into the project. In at least one of the various embodiments, the effect of this organization may be that if the template may be updated, a generated application may automatically pick up the new template upon next replay.

In at least one of the various embodiments, a template may also be a project. In at least one of the various embodiments, a template may be built by defining a canonical structure that may be used as one of the prototypes for generating an application.

In at least one of the various embodiments, a work stream, which may include a plurality of change entries that may be executed together, may be used to execute one or more generated applications. In at least one of the various embodiments, a work stream including a set of change entries (such as change entry 644) that may be executed together may sometimes be described as a change stream.

In at least one of the various embodiments, in response to an attempt by a user to access a generated application such as application 650 from a particular change stream, the following algorithm may be used to produce or retrieve the generated application (such as application 650).

Figure 10:
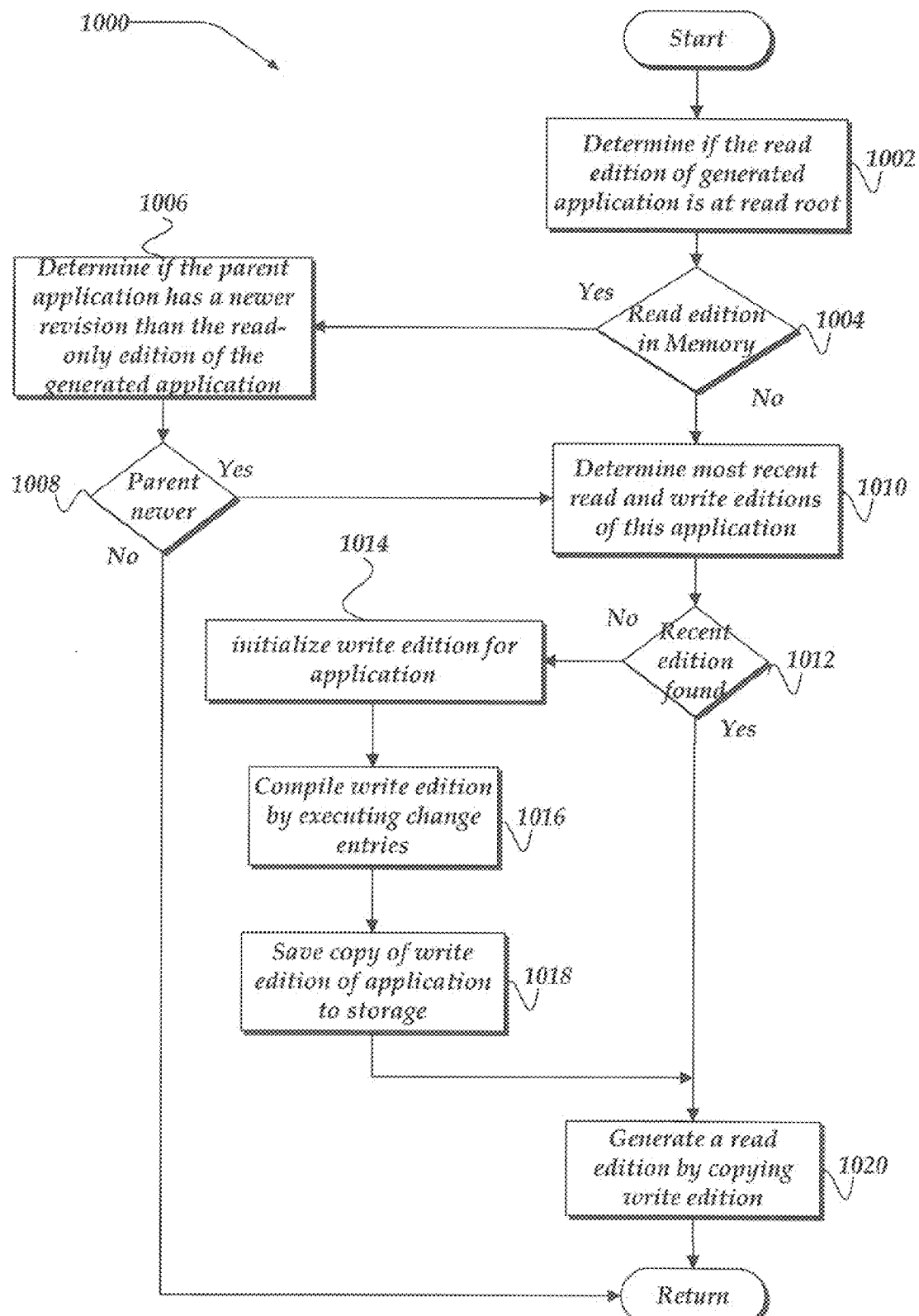
FIG. 10 shows a flowchart for a process to execute or retrieve the generated data processing application in accordance with the embodiments.

FIG. 10 shows a flowchart for at least one of the various embodiments, of process 1000 to execute or retrieve the generated data processing application. In at least one of the various embodiments, if an authorized user requires access to a generated data processing application, the data processing platform may ensure that the user may be accessing a version of the generated data processing application that may be synchronized with the latest change entries that may be associated with the generated data processing application.

In at least one of the various embodiments, users may access (e.g., use) read-only versions of the generated data processing application. In at least one of the various embodiments, the data processing platform may determine if the read-only (e.g., user accessible version of the application) data processing application incorporates the relevant change entries that may be associated with the generated data processing application.

In at least one of the various embodiments, the data, change entries, work streams, models, application architecture, and application logic that may be associated with a generated application may be stored in a read and write version of the application, also known as a parent project. In at least one of the various embodiments, the parent project preserves the content and form of the generated application but it may not generally be accessible by users. In at least one of the various embodiments, a user may access the read and write version of the application (e.g., the parent project) of a generated application if they may be "developing" the application which may comprise modifying portions of the application such as, data, objects, architecture, logic, models, user-interface component, or the like, of the generated application.

In at least one of the various embodiments, a user utilizing the generated application (e.g., not developing, modifying, or creating the application) may access the generated application through a read-only version of the application. In at least one of the various embodiments, accessing the generated application through the read only version may restrict the user to accessing the generated application by using the user-interface/reports created by the application's creator. Whereas, accessing the application through the rand and write version (the parent project) may enable access to all the underlying data, objects, change entries, models, templates, application development tools, and the like.

In at least one of the various embodiments, a read-only version of the generated application may be located at a read root which may be the starting point of the generated application. In at least one of the various embodiments, from a read root the other parts of the read-only version generated application may be accessed by users. (See, Generated Application Root 1502 in FIG. 15).

In at least one of the various embodiments, a generated application may have a write root where the read and write version of the generated application may be located. In at least one of the various embodiments, the write root may point to a read and write version of the generated application generated by the data processing platform during the application development process. In at least one of the various embodiments, the write root may be written to by the platform as modifications to the generated application may be made by the platform (e.g., during the rapid development process).

After a start block, at block 1002, in at least one of the various embodiments, the memory cache of the data processing platform may be examined to determine if the read-only version of the generated application may located at the read root in a cache or local memory.

In at least one of the various embodiments, the platform may generate one or more "executable" instances of the generated application by compiling the relevant associated change entries to generate an executable version of the generated application.

In at least one of the various embodiments, read-only executable versions of the generated application may be held and/or cached in memory and located at the read root.

In at least one of the various embodiments, a read-only edition of generated application may be generated by the data processing platform if the generated application may be released for use (usually after the user developing the application is finished developing the application).

At decision block 1004, in at least one of the various embodiments, if the read-only edition of the generated application at the read root may be found in the cache, or other storage, control may move to block 1006. Otherwise, in at least one of the various embodiments, control may move to block 1010.

At block 1006, in at least one of the various embodiments, determine if the parent application (i.e., the application upon which this application was based) currently has a newer revision than the read-only edition of the generated application.

At decision block 1008, in at least one of the various embodiments, if the read-only edition of the generated application has the same version as the parent project application, allow the user to access (use) the read-only edition of the generated application and return control to the calling process. Otherwise, control may move to block 1010.

At block 1010, in at least one of the various embodiments, a determination may be made as to the most recent read and write edition of the application by determining the most recent change entry. In at least one of the various embodiments, the read or write edition of the application may be loaded from an on-disk checkpoint (this may be done as a performance optimization so that the change entries in block 1016 may not unnecessarily re-processed).

At decision block 1012, if a write edition of the application may be unavailable, or if a write edition may be stale (may not include all change entries, out-of-date edition), control may move to block 1014. Otherwise control may move to block 1016.

At block 1014, in at least one of the various embodiments, the write edition is initialized either blank or, if there may be a parent application, by taking a copy of the parent application's non-stale write edition.

At block 1016, in at least one of the various embodiments, a write edition of the application may be compiled at least in part by executing the latest change entries associated with the generated application. In at least one of the various embodiments, starting at the current version, each change entry in the associated work stream is iterated over in chronological order (as shown in FIG. 11 for at least one of the various embodiments).

At block 1018, in at least one of the various embodiments, a copy of the write edition of the generated application is saved to storage as a checkpoint for future use in step 1010. In at least one of the various embodiments, saving a write edition to storage may reduce unnecessary re-processing of change entries.

At block 1020, in at least one of the various embodiments, a read edition of the generated application may be made by copying the write edition. If the read edition of the generated application may be available for use by authorized users, control may be returned to the calling process.

Figure 11:
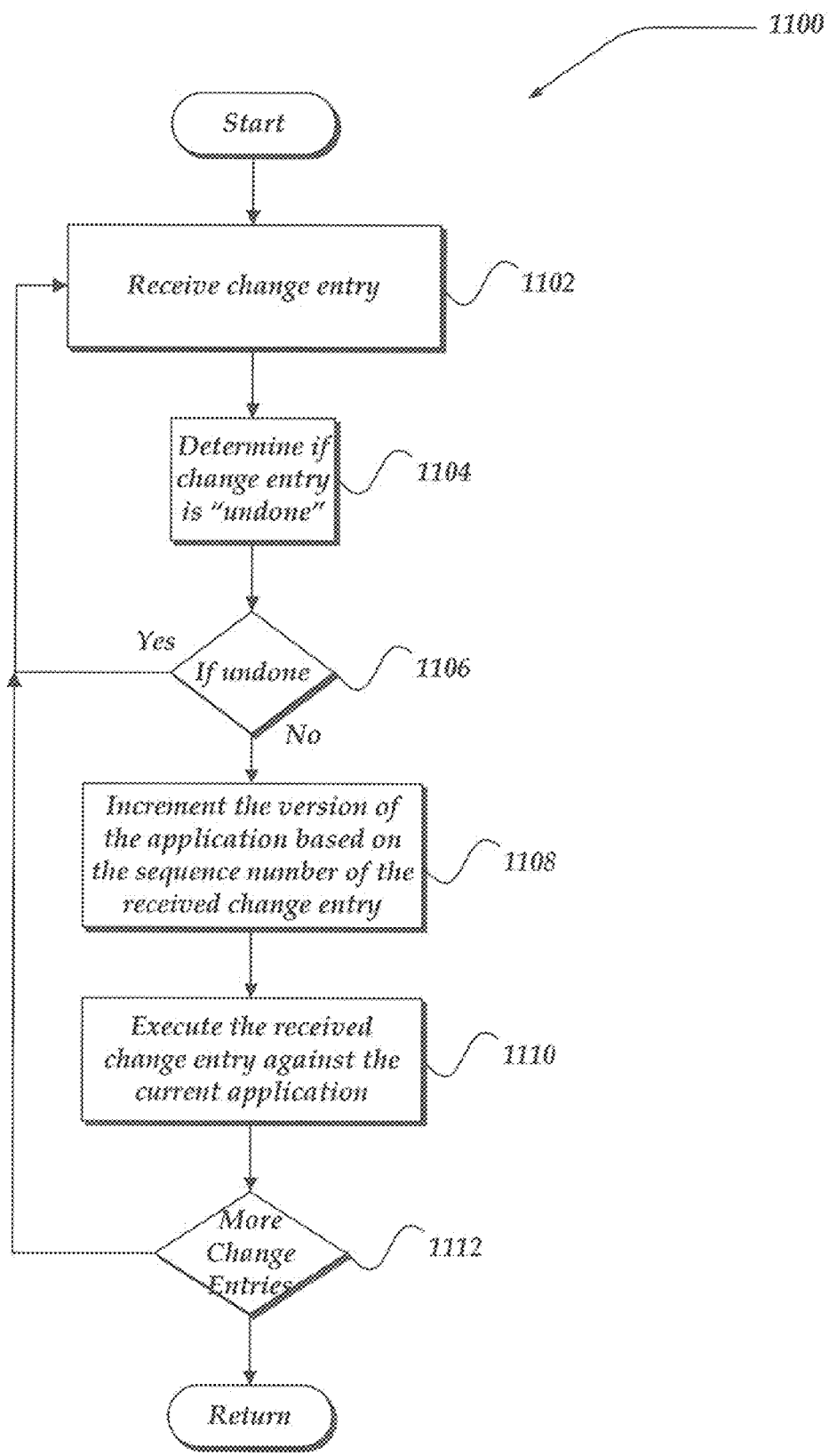
FIG. 11 shows a flowchart for a process for executing change entries in accordance with at least one of the various embodiments.

FIG. 11 shows a flowchart for process 1100 for executing change entries in accordance with at least one of the various embodiments. After a start block, at block 1102, a change entry may be received by a data processing platform for processing.

At block 1104, in at least one of the various embodiments, determine if the change entry may have been marked as undone. In at least one of the various embodiments, users may modify work streams by marking a change entry as undone to reverse the effects of the operations that may be associated with the change entry. In at least one of the various embodiments, the effects of the change entry may be undone by clearing the generated application and re-executing all of the "not undone" change entries associated with the work stream. In at least one of the various embodiments, a change entry may have a status property that may indicate, among other things, if the change entry may be 'undone'.

At decision block 1106, in at least one of the various embodiments, if the change entry may be marked undone, control may loop back to block 1102. Otherwise, control may move to block 1108.

At block 1108, in at least one of the various embodiments, the version of the application is updated based on this change entry. In at least one of the various embodiments, the current revision for the application is incremented to a sequence number that may be associated with this change entry. For example, in at least one of the various embodiments, if the current revision may be 32.7.4.0, it may be incremented to become 32.7.4.1.

At block 1110, in at least one of the various embodiments, the received change entry is executed against the application. In at least one of the various embodiments, the actions performed on the application may depend upon the specific type of change entry and its parameters.

In at least one of the various embodiments, executing a change entry may recreate the step or steps taken during the development of the generated application. For example, data transformations, adding objects, modifying objects, establishing application logic, crafting user-interface view and/or reports, or the like.

At decision block 1112, in at least one of the various embodiments, if more change entries remain to be processed control may loop back to block 1102. Otherwise, control may be returned to the calling process.

Use Case Illustrations

Figure 12:
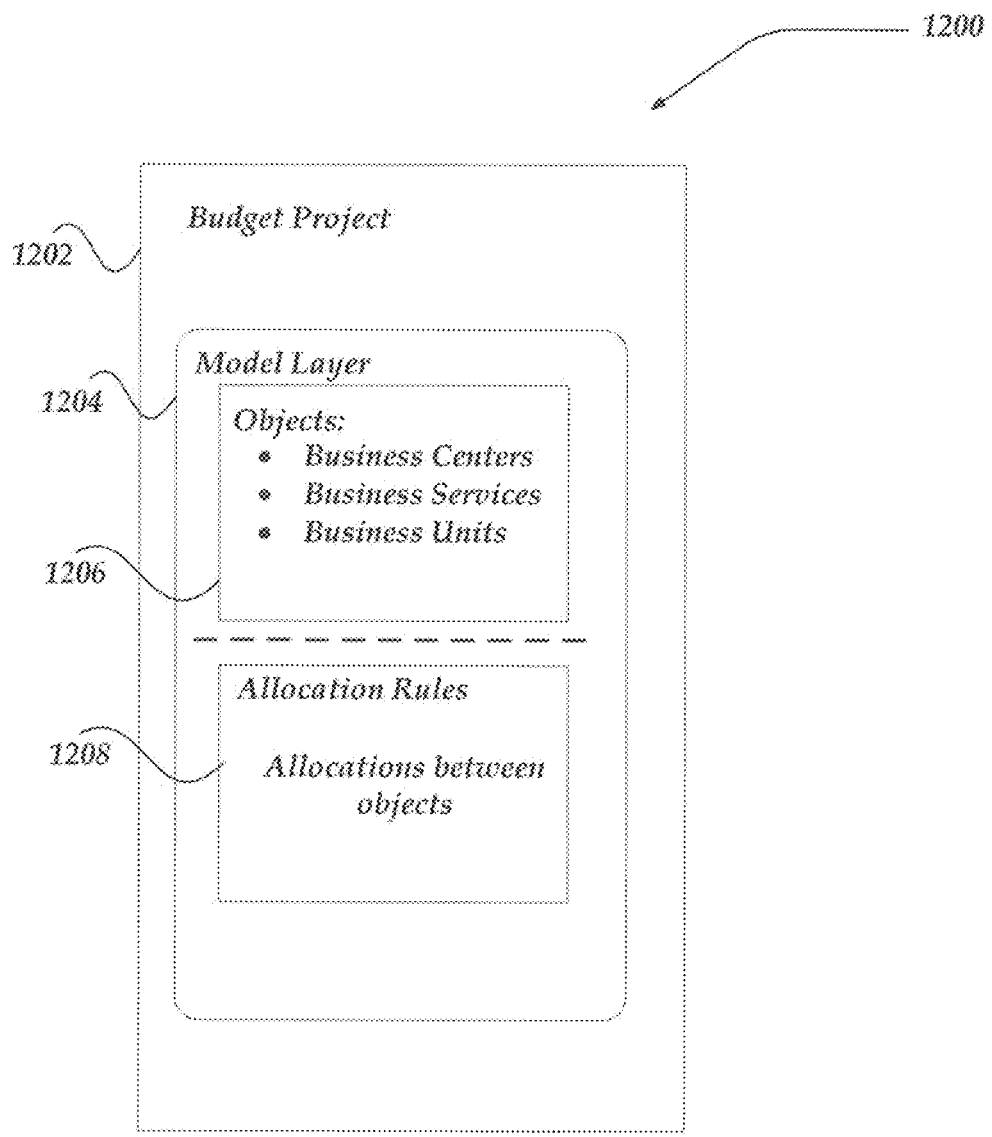
FIG. 12 illustrates a logical schematic of a generated application in accordance with at least one of the various embodiments.

FIG. 12 illustrates a logical schematic of project 1200 in accordance with at least one of the various embodiments. In at least one of the various embodiments, budget project 1200 may be a part of a generated data processing application that may be generated by a data processing platform.

In at least one of the various embodiments, a generated data processing application based on a budget project may have model layer 1204 that includes the logical representation of all the entities, services, and items considered to be addressed by the budget. In at least one of the various embodiments, model layer 1204 may include one or more objects 1206 that may represent the entities, services, and items, that may be included in the budget. In at least one of the various embodiments, objects 1206 may include business centers, business services, business units, servers, laptops, desktops, mobile devices, storage, projects, work tickets (such as for a help desk), cost centers, general ledger transactions, sub-ledger line items, rate cards, or the like. In most cases, model layer 1204 may be comprised of objects 1206 that represent the particular items a business intends to manage within a particular budget. Accordingly, each budget project may include a set of objects that may be unique for each business.

In at least one of the various embodiments, objects 1206 may be implemented using software modules arranged to model objects 1206 in a budget project 1200. One of ordinary skill in the art will appreciate that such objects may be implemented using one or more computer programming languages, computer scripting languages, database stored procedures, or the like. Further, in at least one of the various embodiments, objects 1206 may be stored and/or implemented using databases, including, SQL databases, object oriented databases, column-oriented databases, NoSQL databases, custom databases, or the like.

In at least one of the various embodiments, a budget project's model layer 1204 may include allocation rules 1208 that may define in part how objects 1206 relate to each other within the context of a particular budget project. In at least one of the various embodiments, allocation rules 1208 may be used to define how one object, such as Storage Services, may be allocated among other objects. Operators may arrange one or more allocation rules to match the entities being modeled within the budget. In at least one of the various embodiments, one or more allocation rules may be defined in part based on templates, user-interface dialog boxes, command-line commands, configuration files, policy rules, business rules, and the like.

In at least one of the various embodiments, allocation rules 1208 may determine how budget costs may be propagated through the budget between and among at least the objects that make up the budget.

Figure 13:
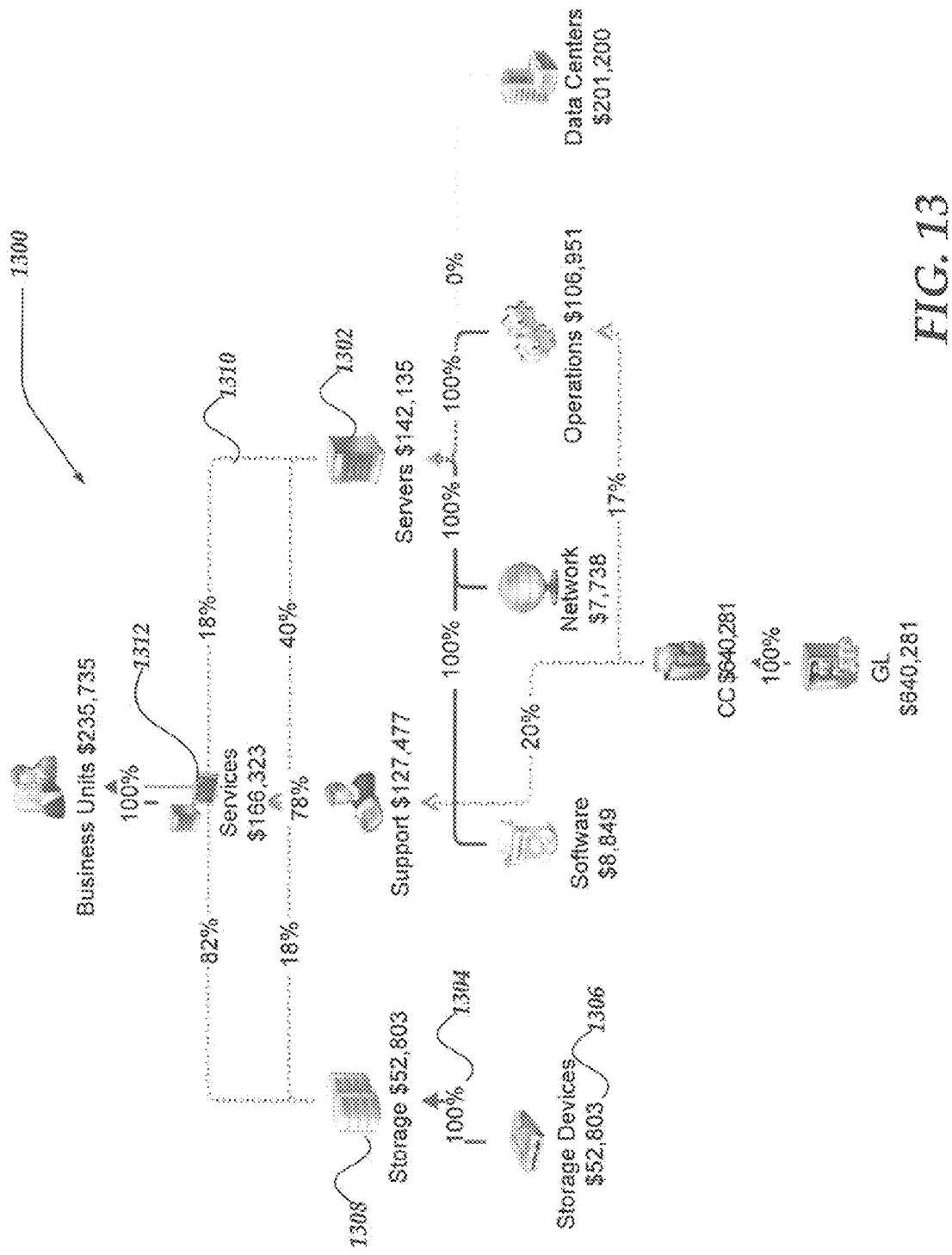
FIG. 13 illustrates an embodiment of a generated data processing application that at least enables visualization of financial allocation model in accordance with the embodiments.

FIG. 13 illustrates an embodiment of a generated data processing application that at least enables visualization of financial allocation model 1300. In one of the various embodiments, the financial allocation model's allocation rules may be represented as edges (the lines) and the cost objects may be represented as nodes (including an icon and textual name). In at least one of the various embodiments, each element in a financial allocation model may display a value summarizing the costs associated with cost object represented by the node. For example, in one of the various embodiments, node 1302 represents cost object Servers that may be allocated $142,135 of the costs in financial allocation model 1300. In at least one of the various embodiments, cost object Servers 1302 may include one or more cost line items categorized as servers.

Furthermore, in at least one of the various embodiments, allocation rule information may be displayed on the edges between financial allocation model nodes. In some cases, the displayed information may represent a percentage, or ratio, of a cost or expense that may be allocated from one cost object to another. In at least one of the various embodiments, edge 1304 indicates that 100% of costs of cost object Storage Devices 1306 may be allocated to cost object Storage 1308. In at least one of the various embodiments, the underlying allocation rules may control how costs and expenses can be allocated and/or propagated through the financial allocation model.

In at least one of the various embodiments, a user may be enabled to examine or modify allocation rules by clicking on one or more elements (e.g., nodes, edges, or the like) in the financial allocation model visualization to reveal additional detail and/or options.

FIG. 14 illustrates a partial view a work stream that may include change entries implemented as audit log 1400 in accordance with at least one of the various embodiments. In at least one of the various embodiments, if a modification may be made to a generated data processing application, such as a financial modeling application, a change entry record corresponding to the modification may be stored in audit log 1400. In at least one of the various embodiments, an audit log may include enough information in each record to determine what modification occurred, the time when it occurred (e.g., timestamp), and who and/or what caused the modification. In at least one of the various embodiments, an audit log may include enough information in each record to enable recorded modifications to be replayed, recreated or undone. Also, in at least one of the various embodiments, multiple audit log records may be replayed to generate "duplicate" data processing applications. In at least one of the various embodiments, a data processing application may be a duplicate of another data processing application if it may have been created by replaying the audit log records generated from the data processing application.

In at least one of the various embodiments, an audit log 1400 may store information, such as, row identifier 1402 Timestamp 1404, User 1406, Status 1408, and Description 1410, or the like. Also, audit logs may be arranged in other ways. In at least one of the various embodiments, audit logs may have more or less values per row than as shown in FIG. 1400. In at least one of the various embodiments, a sufficient configuration may include enough information to enable replaying or recreating the modifications made to a data processing application. Additionally, in at least one of the various embodiments, audit logs may be altered by marking a record as undone. In at least one of the various embodiments, Status 1408 may indicate if an audit log record (e.g., change entry) may have been undone. For example, in audit log 1400, rows 1412 and 1414 are shown with a Status value that may indicate that the recorded modification has been undone. In at least one of the various embodiments, an undone record remains in the audit log with a Status indicating that the recorded action has been undone.

Further, in at least one of the various embodiments, an audit log may reference other files, tables, databases, or the like, rather than storing all of the data and information required to recreate the recorded modification directly within audit log 1400. For example, in at least one of the various embodiments, if recorded modifications may require significant data uploads, audit log 1400 may reference another source for the uploaded data (e.g., a file system, database, or the like) to avoid storing excessive duplicate data within the audit log itself.

In at least one of the various embodiments, the audit log may further include records that reference other audit logs. In at least one of the various embodiments, this may indicate that a template or other generated application's work stream may be included in the generated application associated with audit log 1400. In at least one of the various embodiments, change entries that may be included in the reference audit log/workstream may be applied to generated application the same as if the actions may have been take directly on the generated application.

FIGS. 15-18 illustrate a logical representation of a generated data processing application in accordance with the embodiments.

FIG. 15 shows a high-level logical representation for at least one of the various embodiments, of a generated data processing application. In at least one of the various embodiments, application root 1502 may be the top of a data structure that may contain an executable generated application.

In at least one of the various embodiments, data 1504 may be the top level root to the data elements that may comprise the application. In at least one of the various embodiments, models 1506 may comprise the models employed by the generated application. And, in at least one of the various embodiments, user-interfaces 1508 may comprise graphical user-interface elements that may be provided to a user for interacting and/or viewing the generated data processing application.

In at least one of the various embodiments, the application root may be a write root that may refer, identify, and/or reference the location to a read and write version of the generated application. Or, the application root may be a read root that may refer, identify, and/or reference the location to a read-only version of the generated application.

Figure 16:
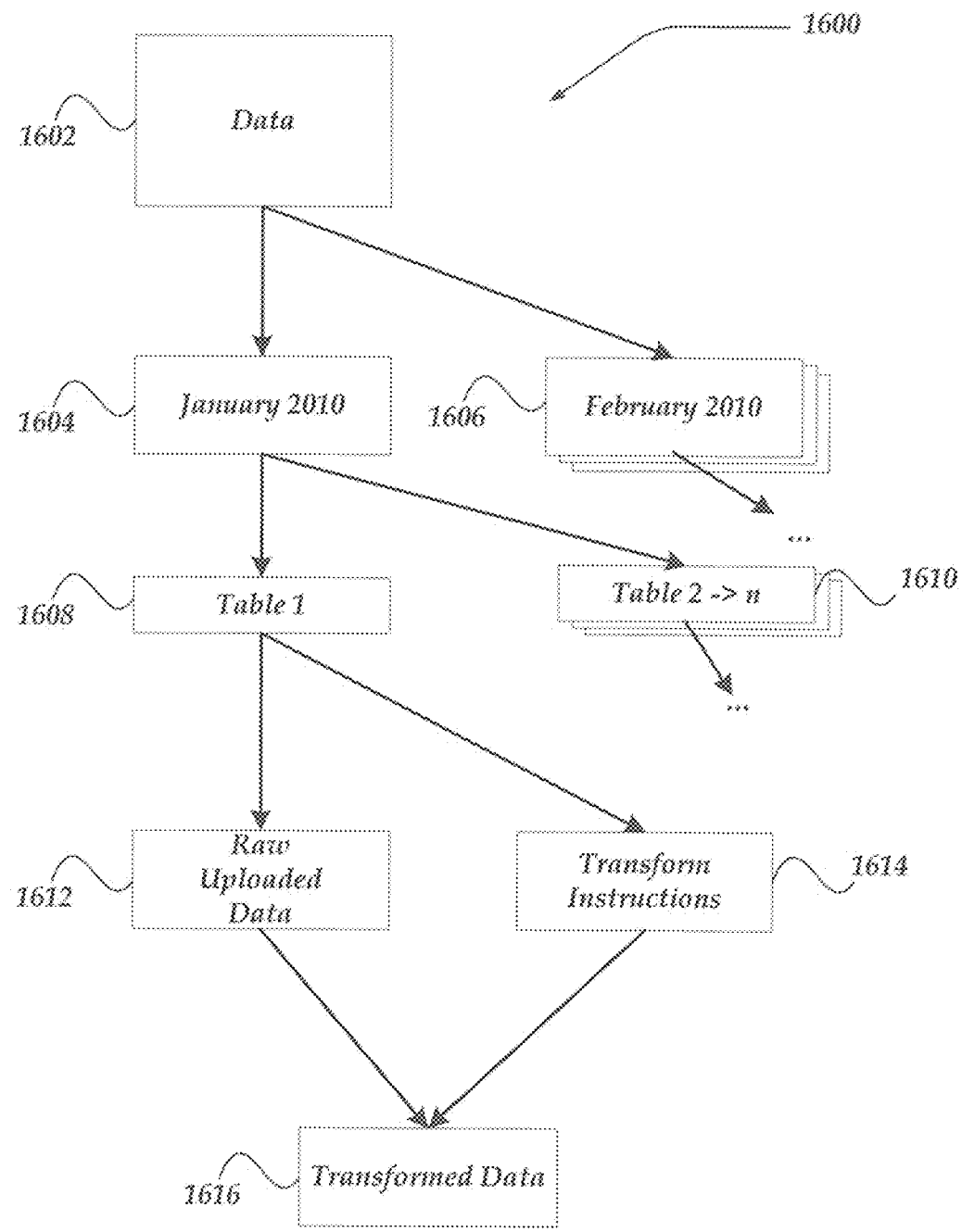

FIG. 16 illustrates an expanded view of application data sub-tree 1600 for at least one of the various embodiments that may be part of a generated data processing application.

In at least one of the various embodiments, data may be organized and/or associated in groupings or buckets that may be based on one or more factors. For example, in at least one of the various embodiments, data blocks 1604-1606 may represent data in a generated application that may be arranged and/or grouped by months with block 1604 representing data associated with the month of January 2010.

In at least one of the various embodiments, data associated with block 1604 may include several tables (e.g., tables 1608-1610). In at least one of the various embodiments, each table may hold data associated and/or managed by the generated data processing application.

In at least one of the various embodiments, each table 1608-1610 may be associated with raw uploaded data and transform instructions. In at least one of the various embodiments, table 1608 may be associated with raw uploaded data table 1612 and transform instructions 1614. In at least one of the various embodiments, raw uploaded data table 1612 may be the original uploaded data as it was uploaded by the import layer.

In at least one of the various embodiments, transform instructions may be instructions that may have been performed on raw uploaded data 1612 to produce transformed data table 1616. In at least one of the various embodiments, transform instruction may included steps such as hiding, merging, or inserting columns, as well as instructions to hide or exclude rows matching filter expressions, re-ordering or columns, or the like.

Figure 17:
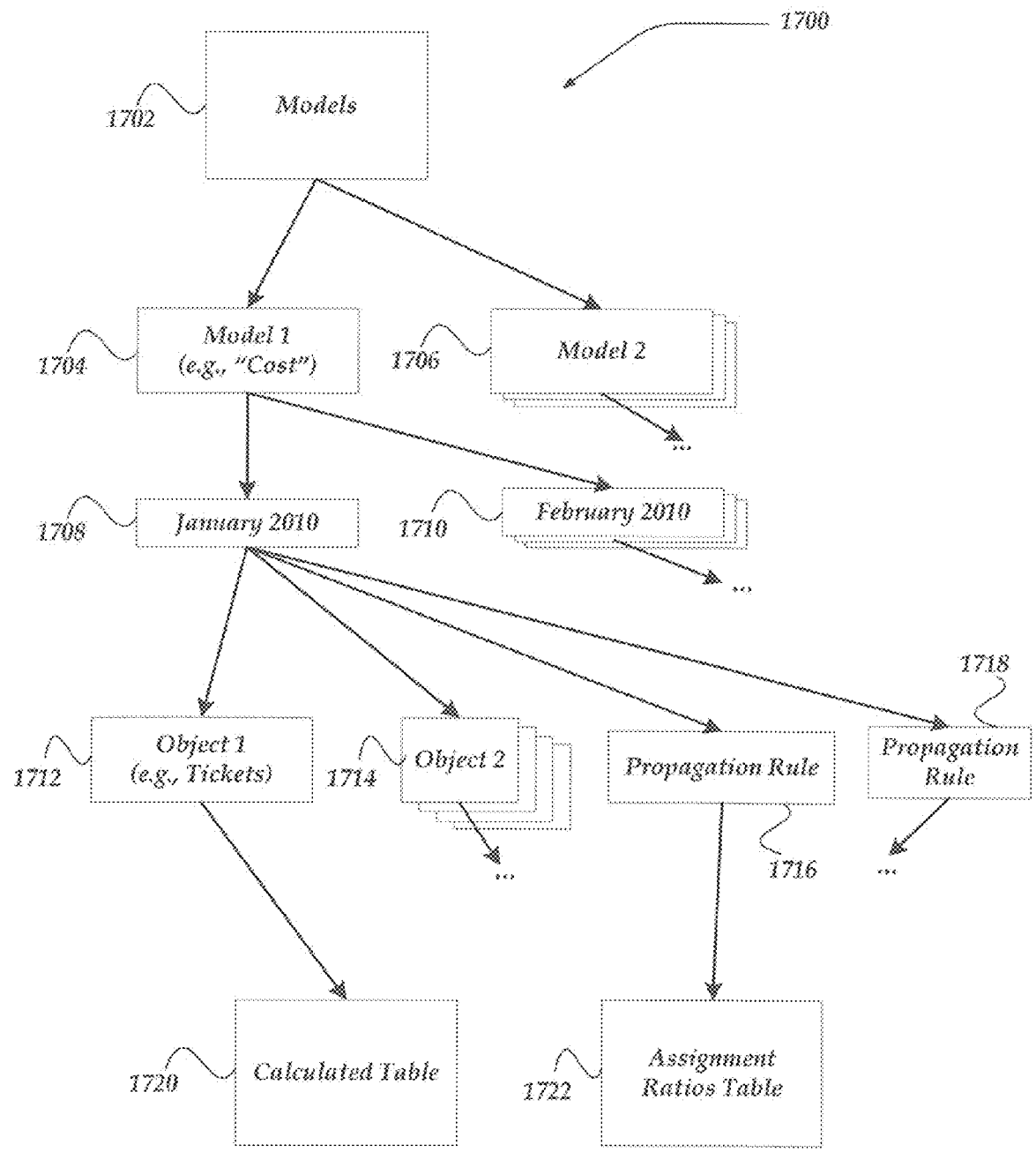

FIG. 17 shows an expanded view of a generated data processing application's model 1700 for at least one of the various embodiments. In at least one of the various embodiments, model 1702 may represent that objects and rules associated with a generated data processing application.

In at least one of the various embodiments, models 1704-1706 may be the one or more models that may be associated with a generated data processing application. In at least one of the various embodiments, one of models in an application may be model 1708 that may represent a cost model for use in a generated financial application.

In at least one of the various embodiments, the parts of model 1704 may be classified, sliced, and/or grouped based on various factors such as month and year (e.g., groups 1708-1710).

In at least one of the various embodiments, each slice of a model may include a collection of objects and rules. In at least one of the various embodiments, objects 1712-14 and propagation rules 1716-1718 may be may be associated with slice 1708. In at least one of the various embodiments, each object may be generated to represent classes of items managed by the application, such as, printers, email servers, employees, contracts, servers, laptops, commercial software applications, or the like.

In at least one of the various embodiments, object 1712 may be employed to generate calculated table 1720. Also, in at least one of the various embodiments, propagation rule 1716 may be employed to generate assignment ratios table 1722.

Figure 18:
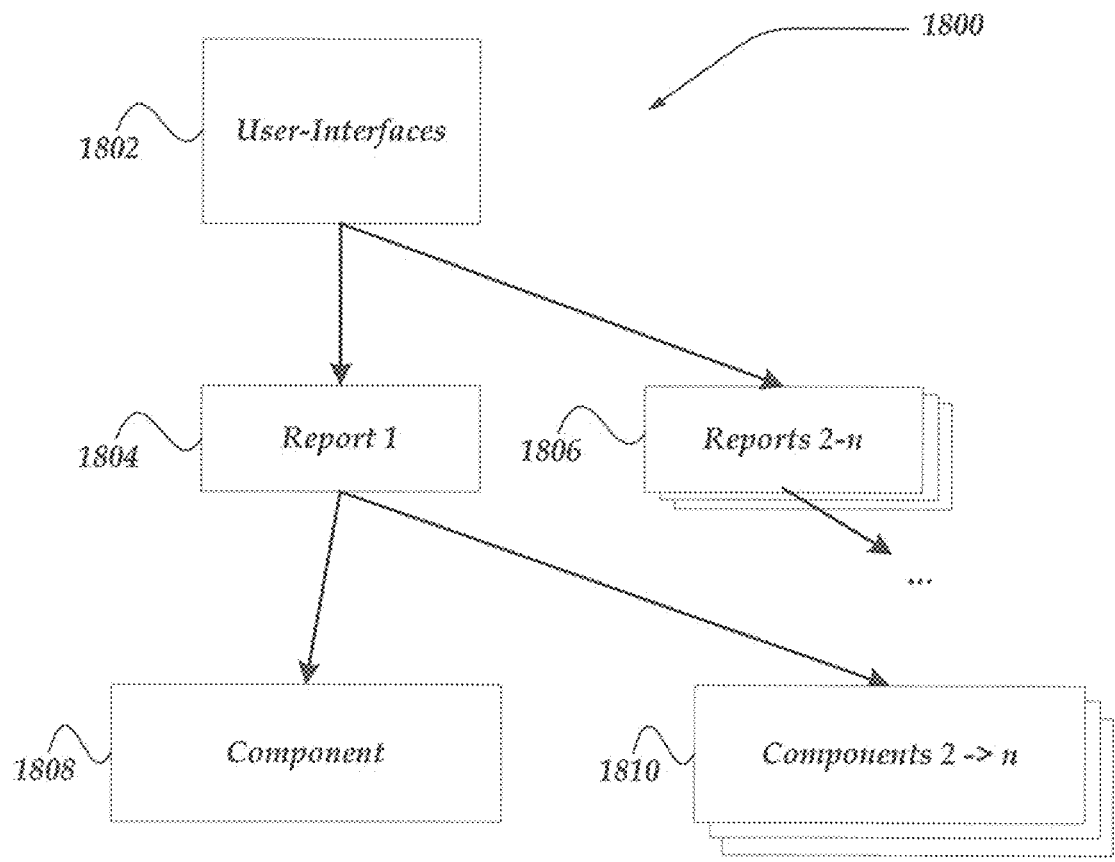

FIG. 18 represents a logical representation of user-interface 1800 for at least one of the various embodiments. In at least one of the various embodiments, user-interface 1800 enables the developer of a generated data processing application to create user-interfaces that may enable a user to view, access, and interact with the generated application.

In at least one of the various embodiments, a generated application may have user-interfaces 1802 that may include multiple reports 1804-1806. In at least one of the various embodiments, each report may be designed to allow users to interact with generated application by offering a collection of user-interface components 1808-1810. In at least one of the various embodiments, user interface components may be a graphical user interface element such as, a table viewer, chart, button, slider, or the like.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

What is claimed as new and desired to be protected by Letters Patent of the United States is:

1. A method for employing a platform to generate an application, wherein the platform employs a network device to perform actions, comprising:
   generating processed data based on provided example data;
   generating an architecture for the application based at least on the processed data;
   generating a model of the application having at least one object based at least on the processed data;
   generating logic to use the model in the execution of the application based at least on the architecture and the processed data;
   generating at least one user interface (UI) component for enabling a user to access at least one object and the processed data;
   preserving each action employed to generate the architecture, the model, the logic, and the UI component; wherein each action is employed to generate a corresponding change entry for the platform;
   generating the application based at least on the architecture, the model, the logic, and the UI component, wherein the application is based at least on each corresponding change entry; and
   enabling the user to access a read-only version of the application for processing provided data, wherein the read-only version is based on a read and write version of the application;
   wherein generating the processed data comprises employing a table processor that is operative to perform actions, including:

receiving the example data in an input data table and a transformation specification for producing an output table for the processed data; and generating the processed data in the data output table based at least on employing the transformation specification to transform the example data in the input data table.

2. The method of claim 1, further comprising, modifying the generated application, wherein each action to modify the generated application is preserved as another corresponding change entry.

3. The method of claim 1, further comprising undoing an effect on the application corresponding to each change entry that is at least one of removed from a work stream and flagged as undone.

4. The method of claim 1, wherein generating the application further comprises generating at least a portion of the application from a template.

5. The method of claim 1, further comprising if the read and write version of the application is newer than the read-only version of the application, executing each change entry that corresponds to the read and write version to generate a new read-only version of the application.

6. The method of claim 1, further comprising enabling the user access to an out of date version of the application until a non-out-of-date version of the application is available.

7. A system that is operative for employing a platform to generate an application over a network, comprising:
   a server device, including:
      a transceiver that is operative to communicate over the network;
      a memory that is operative to store at least instructions; and
      a processor device that is operative to execute instructions that enable actions, including:
         generating processed data based on provided example data;
         generating an architecture for the application based at least on the processed data;
         generating a model of the application having at least one object based at least on the processed data;
         generating logic to use the model in the execution of the application based at least on the architecture and the processed data;
         generating at least one user interface (UI) component for enabling a user to access at least one object and the processed data;
         preserving each action employed to generate the architecture, the model, the logic, and the UI component, wherein each action is employed to generate a corresponding change entry for the platform;
         generating the application based at least on the architecture, the model, the logic, and the UI component, wherein the application is based at least on each corresponding change entry; and
         enabling the user to access a read-only version of the application for processing provided data, wherein the read-only version is based on a read and write version of the application;
      wherein generating the processed data comprises employing a table processor that is operative to perform actions, including:
         receiving the example data in an input data table and a transformation specification for producing an output table for the processed data; and
         generating the processed data in the data output table based at least on employing the transformation specification to transform the example data in the input data table.

8. The system of claim 7, further comprising, modifying the generated application, wherein each action to modify the generated application is preserved as another corresponding change entry.

9. The system of claim 7, further comprising undoing an effect on the application corresponding to each change entry that is at least one of removed from a work stream and flagged as undone.

10. The system of claim 7, wherein generating the application further comprises generating at least a portion of the application from a template.

11. The system of claim 7, further comprising if the read and write version of the application is newer than the read-only version of the application, executing each change entry that corresponds to the read and write version to generate a new read-only version of the application.

12. The system of claim 7, further comprising enabling the user access to an out of date version of the application until a non-out-of-date version of the application is available.

13. A processor readable non-transitory storage media that includes instructions for employing a platform to generate an application, wherein execution of the instructions by a processor device enables actions, comprising:
   generating processed data based on provided example data;
   generating an architecture for the application based at least on the processed data;
   generating a model of the application having at least one object based at least on the processed data;
   generating logic to use the model in the execution of the application based at least on the architecture and the processed data;
   generating at least one user interface (UI) component for enabling a user to access at least one object and the processed data;
   preserving each action employed to generate the architecture, the model, the logic, and the UI component, wherein each action is employed to generate a corresponding change entry for the platform;
   generating the application based at least on the architecture, the model, the logic, and the UI component, wherein the application is based at least on each corresponding change entry; and
   enabling the user to access a read-only version of the application for processing provided data, wherein the read-only version is based on a read and write version of the application;
   wherein generating the processed data further comprises employing a table processor that is operative to perform actions, including:
      receiving the example data in an input data table and a transformation specification for producing an output table for the processed data; and
      generating the processed data in the data output table based at least on employing the transformation specification to transform the example data in the input data table.

14. The media of claim 13, further comprising, modifying the generated application, wherein each action to modify the generated application is preserved as another corresponding change entry.

15. The media of claim 13, further comprising undoing an effect on the application corresponding to each change entry that is at least one of removed from a work stream and flagged as undone.

16. The media of claim 13, wherein generating the application further comprises generating at least a portion of the application from a template.

17. The media of claim 13, further comprising if the read and write version of the application is newer than the read-only version of the application, executing each change entry that corresponds to the read and write version to generate a new read-only version of the application.

18. The media of claim 13, further comprising enabling the user access to an out of date version of the application until a non-out-of-date version of the application is available.

\* \* \* \* \*